(12) United States Patent
Shi et al.

(10) Patent No.: US 10,685,034 B2
(45) Date of Patent: Jun. 16, 2020

(54) SYSTEMS, METHODS, AND APPARATUSES FOR IMPLEMENTING CONCURRENT DATAFLOW EXECUTION WITH WRITE CONFLICT PROTECTION WITHIN A CLOUD BASED COMPUTING ENVIRONMENT

(71) Applicant: salesforce.com, inc., San Francisco, CA (US)

(72) Inventors: Ruisheng Shi, San Francisco, CA (US); Santanu Sinha, Fremont, CA (US); Alex Gitelman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 200 days.

(21) Appl. No.: 15/786,448

(22) Filed: Oct. 17, 2017

(65) Prior Publication Data
US 2019/0114350 A1 Apr. 18, 2019

(51) Int. Cl.
*G06F 16/00* (2019.01)
*G06F 16/25* (2019.01)
(Continued)

(52) U.S. Cl.
CPC .......... *G06F 16/254* (2019.01); *G06F 9/3005* (2013.01); *G06F 9/3855* (2013.01);
(Continued)

(58) Field of Classification Search
CPC combination set(s) only.
See application file for complete search history.

(56) References Cited

U.S. PATENT DOCUMENTS

2008/0114870 A1* 5/2008 Pu .................. G06F 9/5077
709/224
2011/0061057 A1* 3/2011 Harris ............... G06F 9/5072
718/104

(Continued)

*Primary Examiner* — Khanh B Pham
(74) *Attorney, Agent, or Firm* — Elliot, Ostrander & Preston, P.C.

(57) ABSTRACT

In accordance with disclosed embodiments, there are provided systems, methods, and apparatuses for implementing concurrent dataflow execution with write conflict protection within a cloud based computing environment. For instance, an exemplary system having at least a processor and a memory therein includes means for: creating a dataflow definition for a first dataflow type, wherein the dataflow definition includes at least one or more datasets to be accessed by the dataflow and a plurality of functional operations to be performed on the one or more datasets when the dataflow is executed; generating and storing a dataflow version identifying all datasets accessed by the dataflow based on the dataflow definition created; receiving multiple requests for the first dataflow type; enqueuing the multiple requests into a message queue pending execution; selecting, from the message queue, a first runnable dataflow having been earliest enqueued of the first dataflow type for execution based on (i) the first dataflow type being allowable within system limits and based further on (ii) verification that the selected first runnable dataflow is not already executing and based further on (iii) verification there is no write conflict for any dataset accessed by the selected first runnable dataflow. Other related embodiments are disclosed.

25 Claims, 16 Drawing Sheets

(51) Int. Cl.
  *G06F 9/38* (2018.01)
  *H04L 29/08* (2006.01)
  *G06F 9/30* (2018.01)
  *G06F 16/27* (2019.01)

(52) U.S. Cl.
  CPC .......... *G06F 16/27* (2019.01); *H04L 67/1095* (2013.01); *H04L 67/1097* (2013.01)

(56) References Cited

U.S. PATENT DOCUMENTS

2011/0307897 A1* 12/2011 Atterbury ........... G06F 9/44521
　　　　　　　　　　　　　　　　　　　　　　　　718/102
2017/0006135 A1* 1/2017 Siebel .................... H04L 67/02

\* cited by examiner

SYSTEMS, METHODS, AND APPARATUSES FOR IMPLEMENTING CONCURRENT DATAFLOW EXECUTION WITH WRITE CONFLICT PROTECTION WITHIN A CLOUD BASED COMPUTING ENVIRONMENT

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for implementing concurrent dataflow execution with write conflict protection within a cloud based computing environment such as a database system implementation supported by a processor and a memory to execute such functionality. Such means may be implemented within the computing architecture of a hosted computing environment, such as an on-demand or cloud computing environment, which utilizes multi-tenant database technologies, client-server technologies, traditional database technologies, or other computing architecture in support of the hosted computing environment.

BACKGROUND

The subject matter discussed in the background section is not to be assumed as prior art merely as a result of its mention in the background section. Similarly, a problem mentioned in the background section or associated with the subject matter of the background section is not assumed to have been previously recognized in the prior art. The subject matter in the background section merely represents different approaches, which in and of themselves may also correspond to claimed embodiments.

Within large scale computing systems, such as the on-demand cloud based computing system, which is discussed below in greater detail, there is a need to ensure that executing dataflows do not interfere with one another. This is especially problematic when there are multiple dataflows needing to execute which are of the same type, and consequently, exhibit a distinct risk of triggering a write conflict, in which two or more disparate flows of a same type write to the same underlying data store, without either of the processes detecting such a conflicting write event. Such write conflicts must be avoided as they can lead to record corruption and inaccurate query results as well as other problems, such as unexpected application behavior.

Such dataflows are also referred to as work flows or Business Process Management "BPM" flows.

One way of eliminating the potential for write conflicts is to either serialize or queue and release dataflows having a same data type, such that no two dataflows of a same type are permitted to execute at the same time. In such a way, any write to an underlying data store will be completed and committed prior to or upon the completion of a first dataflow and upon the release or serialized execution of a second dataflow of the same type, the recently written data will be retrieved, processed, and any subsequent re-writes to that same location will therefore be based on accurate and up to date data, thus negating any such write conflict.

While such a solution is fully functional and valid, the serialization of such dataflow executions by type or the queue and release of such dataflows creates a bottleneck in the system which because increasingly restrictive as the size of the system grows and as the number of users, organizations, and concurrent processing demands tends to increase over time.

While the serializing and queue then release approach works well for small scale systems, an on-demand cloud base computing architecture serving literally millions of simultaneous users and tens of thousands of businesses, partners, clients, and other organizations, becomes crippled by such an approach, as there is an artificial introduction of latency into the system, which in turn inhibits overall system performance and leads to customer dissatisfaction due to unnecessarily lengthy processing times.

The present state of the art may therefore benefit from the systems, methods, and apparatuses for implementing concurrent dataflow execution with write conflict protection within a cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1A:
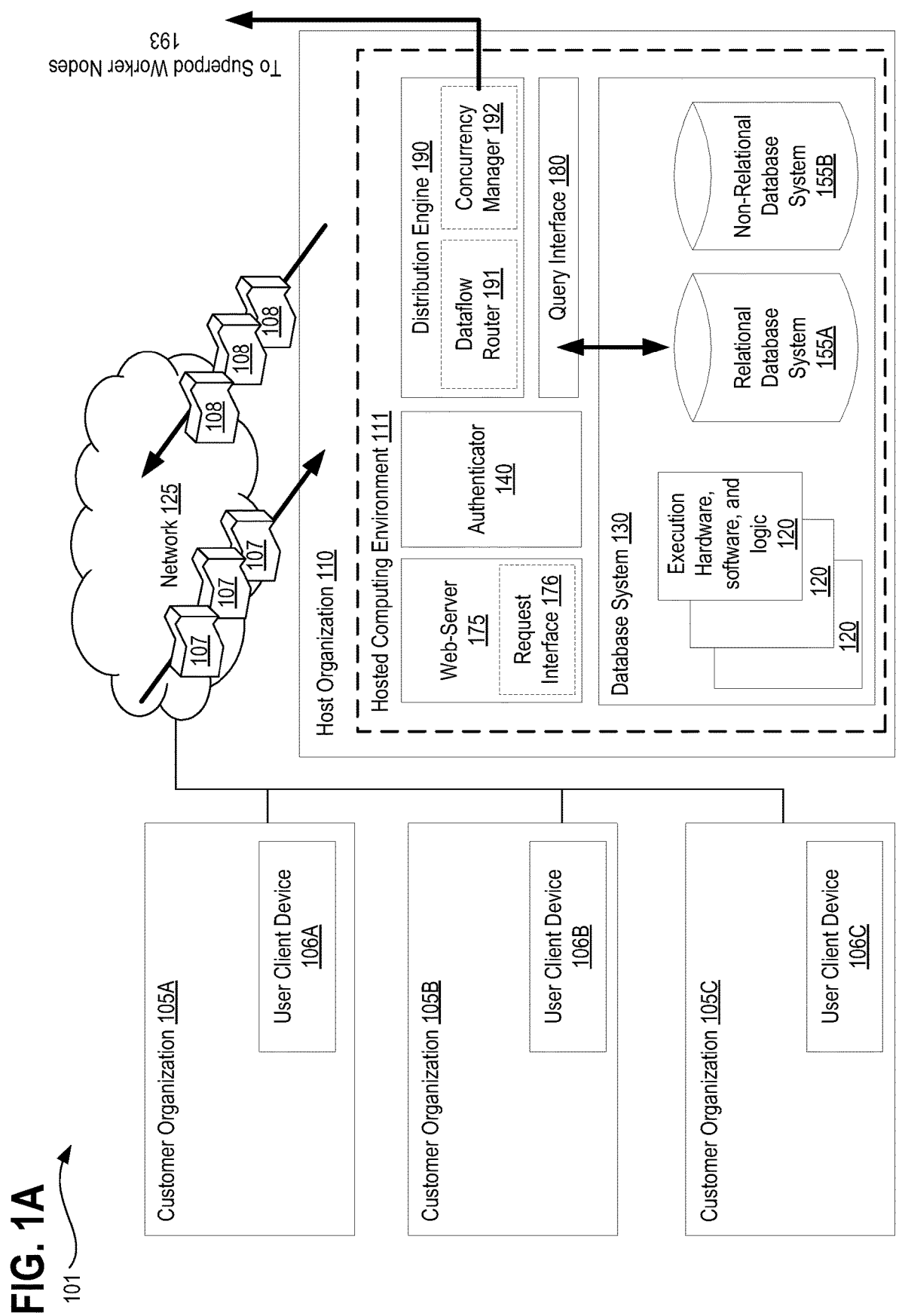
FIG. 1A depicts an exemplary architecture in accordance with described embodiments.

Described herein are systems, methods, and apparatuses for implementing concurrent dataflow execution with write conflict protection within a cloud based computing environment. For instance, such an exemplary system having a processor and a memory therein includes means for creating a dataflow definition for a first dataflow type, wherein the dataflow definition includes at least one or more datasets to be accessed by the dataflow and a plurality of functional operations to be performed on the one or more datasets when the dataflow is executed; generating and storing a dataflow version identifying all datasets accessed by the dataflow based on the dataflow definition created; receiving multiple requests for the first dataflow type; enqueuing the multiple requests into a message queue pending execution; selecting, from the message queue, a first runnable dataflow having been earliest enqueued of the first dataflow type for execution based on (i) the first dataflow type being allowable within system limits and based further on (ii) verification that the selected first runnable dataflow is not already executing and based further on (iii) verification there is no write conflict for any dataset accessed by the selected first runnable dataflow.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations, which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 101 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records with user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130, which communicate with the database system 130 via the query interface. The hardware, software, and logic elements 120 of the database system 130 are separate and distinct from a plurality of customer organizations (105A, 105B, and 105C)

which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 107 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 107 for execution against the databases 155 or the query interface 180, pursuant to which results 108 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 107 are received at, or submitted to, a web-server 175 within host organization 110. Host organization 110 may receive a variety of requests for processing by the host organization 110 and its database system 130. Incoming requests 107 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 107 from various customer organizations 105A-C via network 125 on behalf of the query interface 180 and for providing a web-based interface or other graphical displays to an end-user user client device 106A-C or machine originating such data requests 107.

The query interface 180 is capable of receiving and executing requested queries against the databases and storage components of the database system 130 so as to return a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 107 from the user client devices 106A-C. Request interface 176 further supports the return of response packets or other replies and responses 108 in an outgoing direction from host organization 110 to the user client devices 106A-C.

Authenticator 140 operates on behalf of the host organization to verify, authenticate, and otherwise credential users attempting to gain access to the host organization.

Still further depicted within the hosted computing environment 111 is the distribution engine 190 having therein both a dataflow router 191 and also a concurrency manager 192, which is capable of communicating with Superpod worker nodes 193 within the computer architecture of the hosted computing environment 111.

Figure 1B:
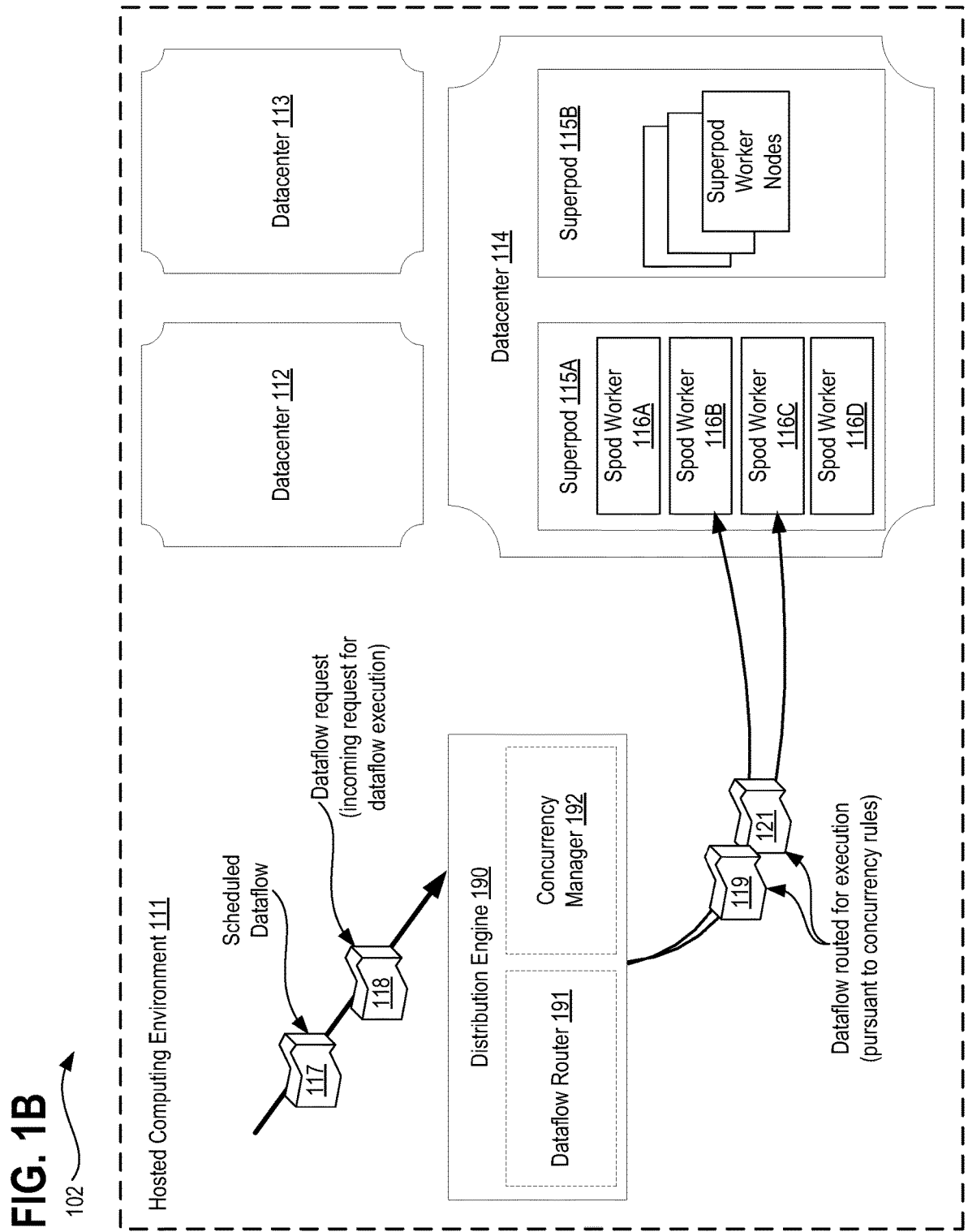
FIG. 1B depicts an exemplary architecture in accordance with described embodiments within which the Superpod worker nodes are depicted in greater detail.

FIG. 1B depicts an exemplary architecture 102 in accordance with described embodiments within which the Superpod worker nodes are depicted in greater detail.

The following definitions are provided to facilitate a better understanding of the described embodiments:

A user dataflow refers to a dataflow created by an end user. Such a user dataflow may be configured to run at a designated time, such as once a day.

An upload dataflow refers to a dataflow created as a result of and from the contents of a file uploaded into the system. Such a file once uploaded, is consumed by the system to automatically create the upload dataflow, which is then executed once on demand.

A dataflow version refers to a Base Platform Object (BPO) that represents a specific state of the dataflow. Such a dataflow version keeps track of email, notification level(s), dataflow definition(s) and cron expression for a particular dataflow. A new dataflow version is created when a related field is modified, thus signifying a new version for a tracked dataflow.

A dataflow instance is a BPO that represents one instance of a dataflow run and is a child object of dataflow.

A dataflow request is a BPO that represents one request of the dataflow runs and is a child object of dataflow. Upon passing post validation, the dataflow request is marked serviced and with corresponding dataflow instance identifier (ID).

A running instance is identified by a dataflow instance row, which is incomplete within the database system. Conversely, a completed dataflow instance row in the database indicates that an instance is no longer running for that dataflow, and may therefore be considered as complete or finished as opposed to a still running dataflow.

A dataset access is a BPO that keeps a record of relationships between dataflow version and any given dataset's Application Programming Interface (API) name. There are two access types: read and write.

As before, there is a hosted computing environment 111, for instance, provided as an on-demand cloud computing environment for users, partners, and customer organizations. Such a hosted computing environment 111 includes multiple geographically distributed data centers 112, 113, 114, around the globe to provide cloud based computing services to different geographically dispersed regions. As can be seen here, there are traversing toward the distribution engine 130, including a scheduled dataflow 117 (e.g., such as a user dataflow which is scheduled for execution at a particular time) and a dataflow request (such as an incoming request for dataflow execution, as the result of, for example, an upload dataflow, which is generated as a result of a file upload, in which the file is consumed, and the dataflow is triggered for execution).

In one embodiment, the hosted computing environment 111 traverses all dataflow scheduling processes through the distribution engine 190, which manages routing of the dataflows via dataflow router 191, and observes concurrent execution of same dataflow types within the computing infrastructure via the concurrency manager 192.

As shown here, dataflows 119 and 121 are routed for execution pursuant to concurrency rules, but forwarding the dataflows 119 and 121 onward toward datacenter 114 where Superpod worker nodes within Superpod 115A take up responsibility for execution of the routed dataflows. Specifically, Superpod workers (Spod workers) 116B and 116C take up execution of the routed dataflows.

The Superpod workers as depicted here do not have tenant contacts and therefore they execute strictly according to what they are instructed to perform. They are segmented from the client specific worker pods.

The Dataflows requiring execution are performed via asynchronous processing and therefore, once the dataflow is performed via a send and forget scheme, such that once a dataflow is sent or scheduled, the submitter does not wait for it to return or complete as the dataflows typically take on the order of hours to complete and can sometimes take days to complete.

Problematically, once a dataflow is submitted or scheduled and enqueued for processing, the submitter or requester does not know which dataflow among many has finished first and therefore, it is possible to have a write conflict or data conflict where there is an order of dependency between multiple dataflows that are desired to be run concurrently. While serializing such dataflows will ensure a correct order of execution and compliance with all dependencies, by serializing dataflows that may otherwise be run concurrently, there is a significant degradation in performance.

The concurrency manager 192 therefore implements conflict controls so as to ensure order dependencies are observed while also permitting multiple dataflows of the same object type to be selected for execution and run concurrently.

Each dataflow is defined within a BPO via JSON and defines all transform nodes via a Directed Acyclic Graph (DAG). A directed acyclic graph (DAG) is a directed graph that contains no cycles. A rooted tree is a special kind of DAG and a DAG is a special kind of directed graph. For example, a DAG may be used to represent common subexpressions in an optimizing a compiler. Each dataflow sets forth a series of pre-defined actions to be performed, such as establishing a data-pipeline with instructions regarding how to process data, perform operations, and generate a result so as to update an underlying data record or table. Each node is an element of the dataflow and the dataflow causes execution to push the nodes to be transformed or updated through the dataflow so as to produce the desired result.

A user dataflow has a fixed definition, which will not change unless it is modified by the user and therefore its payload is fixed. However, a system dataflow is generated at runtime by retrieving data from other BPOs, with such data being then collected via JSON and transmitted to the Superpod at runtime. Therefore, the payload for a system dataflow is inherently variable as it is generated via runtime processes and must be collected at the time the dataflow is requested for execution.

Because the on-demand cloud computing environment permits customers to generate requests it is necessary to provide some protection to the systems of the host organization so as to prevent excessive customer requested dataflows from being submitted and creating excessive load for the Superpod. Therefore, dataflow requests are first created which are then enqueued in a message queue as managed by the distribution engine 190 rather than permitting customer dataflow requests to create dataflow instances, which are immediately sent to the Superpod for execution.

By accepting incoming dataflow requests and enqueuing them, it is then possible for the distribution engine 190 to manage resource usage of the Superpod, for instance, pursuant to user dataflow concurrent execution limits or even pursuant to system dataflow concurrent execution limits. Such limits ensure that the Superpod system is not overwhelmed. Additionally, by accepting the incoming dataflow requests and enqueuing them, it is additionally possible to manage the various concurrency requirements to ensure that concurrently executing dataflows do not create data conflicts or write conflicts with one another. For instance, according to described embodiments, the concurrency manager 192 may select certain "runnable" dataflows for execution, thus creating a dataflow instance to be executed by the Superpod when various criteria are determined to be met. In other instances, enqueued dataflows, which are waiting to be run, may be aborted or delayed or requeued as they cannot yet meet required criteria to be run.

Figure 2A:
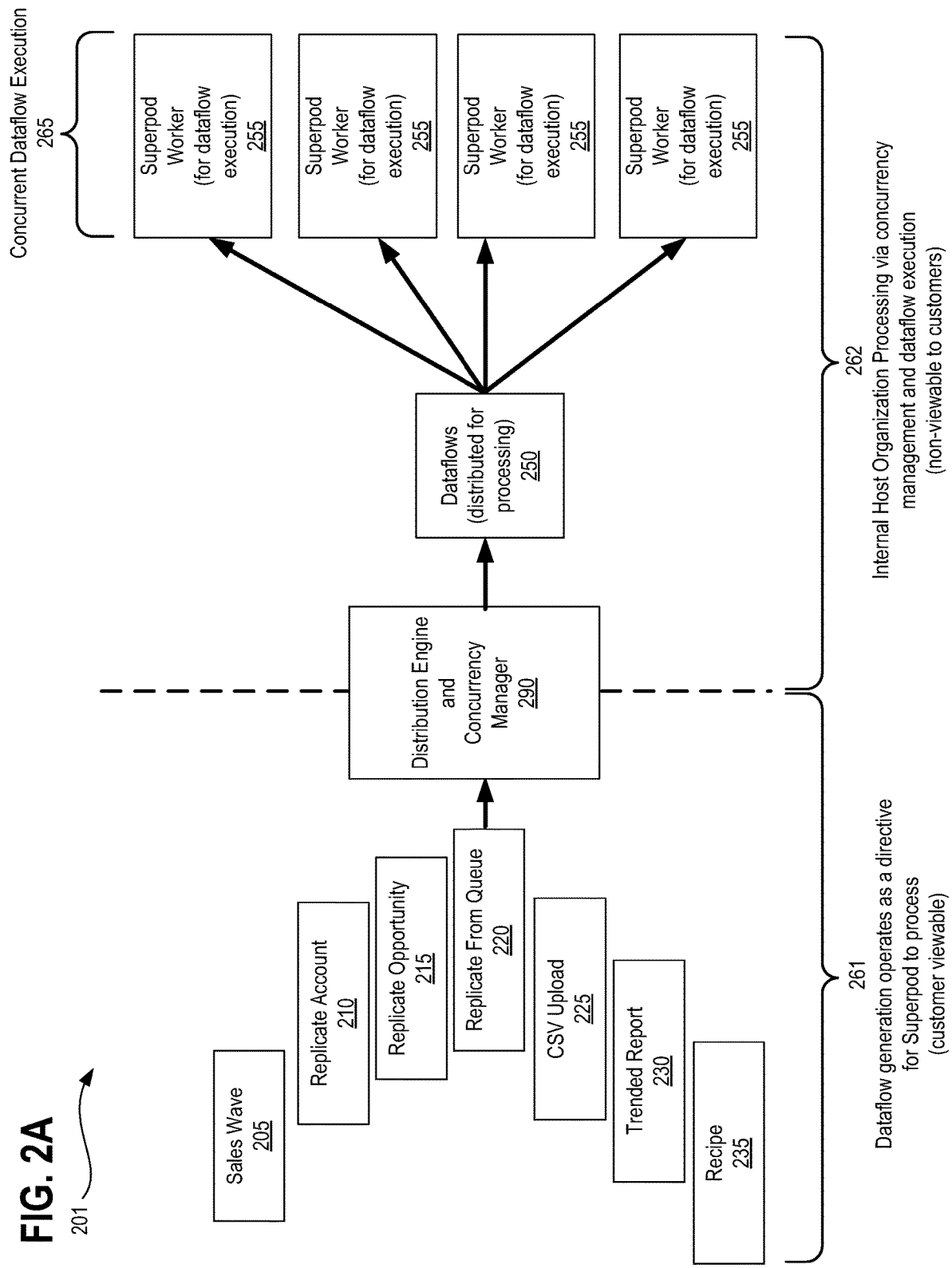
FIG. 2A depicts another exemplary architecture in accordance with described embodiments.

FIG. 2A depicts another exemplary architecture 201 in accordance with described embodiments.

Specifically depicted here is a list of dataflow examples, beginning with a sales wave 205 dataflow, replicate account 210 dataflow, replicate opportunity 215 dataflow, replicate from queue 220 dataflow, CSV upload 225 dataflow, trended report 230 dataflow, and lastly a recipe 235 dataflow. Each of these flows are their own unique type and they each therefore have a corresponding system limit. For example, each dataflow type may have a limit such as a quantity of the number of dataflows of that type which may be executed within a 24 hour period, or the quantity of the number of dataflows of that type which may be executed concurrently on behalf of a user requested dataflow or on behalf of a system requested dataflow, etc. Moreover, different dataflow types may not necessarily have the same limits. For example, certain dataflows may have a limit of 15 total dataflow executions of a given type per 24-hour period, whereas others have no such limit, but rather, may simply have a total concurrent execution limit, such as a maximum of 3 dataflows of a given type executing concurrently at any given time.

Dataflow generation operates as a directive for the Superpods to process the assigned dataflows as denoted by element 261. As noted here, the various dataflow examples are viewable by customers, based on, for example, their affiliation with the dataflow as a dataflow originator, dataflow uploader, dataflow requestor, etc.

As shown here, the replicate from queue 220 dataflow causes multiple dataflows to be distributed for processing as denoted by element 250, with the dataflows then being routed and assigned by the distribution engine and concurrency manager 290 for concurrent dataflow execution 265 via the Superpod workers 255. Unlike the dataflow examples on the left, the concurrent dataflow execution 265 as depicted on the right is internal host organization processing utilizing concurrency management and dataflow execution as denoted by element 262 and such processing is non-viewable to customers regardless of their affiliation with the respective dataflows being executed by the host organization.

According to certain embodiments, distribution engine and concurrency manager 290 provides distribution schemes (e.g., concurrency, parallelism, serialized, queue and release, FIFO, prioritized, round-robin, etc.) of dataflows requested or scheduled for execution into the computer architecture of the hosted computing environment 111 (FIGS. 1A and 1B). According to certain embodiments, the distribution engine and concurrency manager 290 utilizes Superpod worker nodes to perform its scheduling and concurrency management algorithms while distributing the workflows themselves into non-Superpod worker nodes. In other embodiments, dataflows may also be distributed into Superpod nodes for execution where the requestor of the dataflow is a configured Superpod rights user, or alternatively where the concurrency manager elects to distribute a given dataflow into a Superpod for execution based on other prioritization metrics.

According to described embodiments, there is no limit applied to the concurrent execution of any given dataflow type, therefore permitting theoretically unlimited concurrent dataflow execution, limited only by the hardware capabilities of the underlying system, rather than having an artificial limit imposed onto the concurrent execution of dataflows by the system.

Such methodologies are distinct from previously known and utilized techniques because the concurrent dataflow execution capabilities utilize a wave analytics architecture and platform, which leverages a multi-tenant aware application server environment. By design, Superpod worker nodes within the wave analytics architecture are tasked with performing the computational overhead associated with enabling the concurrent dataflow execution capabilities.

Superpod technology provides very large organizations with significant computational demands a dedicated instance of Salesforce.com application services within the host organization's existing public-cloud, multitenant model. Generally speaking, the Superpod technology and service offering is highly selective and provided to only the very largest customer organizations operating within the host organization's computing architecture, for instance, customer organizations on the scale of the United States government or other large corporations.

The Superpod technology utilizes multiple compute pods that Salesforce has distributed across its global datacenters to run its entire operation. Each pod provides the host organization's on-demand cloud based computing services, serving tens of thousands of customers with multi-tenant compute services. Other than being dedicated to a specific customer organization, the host organization's Superpods are identical to Salesforce.com's other compute pods provided to all other customer organizations and both Superpods and the host organization's other compute pods deliver the same on-demand cloud based multi-tenant services.

Similar to the use of Superpods by certain customer organizations, the host organization itself utilizes the Superpod technology in accordance with certain embodiments, thus utilizing one or more dedicated compute pods within the host organization to execute the functionality associated with the concurrent dataflow execution capabilities, which are described herein. However, it is not strictly necessary to utilize such Superpod technology and thus, alternative embodiments may utilize compute pods of the host organization and operate as a tenant or entity within such compute pods among other customer organizations serviced by the host organization.

The concurrent dataflow execution capabilities utilize a so called "Base Platform Object" or "BPO" which is a framework that manages standard objects in the same way that custom objects are managed by the system. According to certain embodiments, Base Platform Objects further include auditing fields and are stored within the same table as other BPOs of a same object type. Moreover, all interactions with BPO objects utilize the same mechanism within the host organization's computing architecture as all custom objects, but are exposed to the concurrent dataflow execution in an identical manner as any other standard object, such as "Account" or "User" or any "CustomEntityDefinition" type object. For instance, data stored for any new or custom built features are stored within the BPO framework according to certain embodiments.

Further provided by the concurrent dataflow execution capabilities is asynchronous processing, providing users with a "send and forget" mechanism, which implements edgemart/dataset, write conflict detection. Edgemart transformation gives dataflows access to an existing, registered dataset, which may contain data stored internally to the host organization, externally stored data, or a combination of the two. Use of edgemart transformation permits reference to any internal or external dataset such that it may be used in subsequent transformations within the dataflow in question. in the dataflow. Use of edgemart transformation may be further utilized with the Augment transformation function to join an existing dataset with a new dataset.

The Wave analytics platform enables users to work with large data files and data sets by creating graphs, charts and other pictorial representations of such data. Further provided by the Wave analytics platform are tools permitting users to drill down into key parts of their business data with only a few clicks and little or no training in data analysis.

Within the Wave analytics platform, dataflows are utilized to build data sets, however, serialized or queue and release execution can limit throughput and appear to the end user as a latency issue. Through the use of concurrent dataflow execution, throughput has been observed to increase by as much as 800% with significantly reduced latency.

According to described embodiments, execution of any dataflow includes a process that is requested by a core application server, which is then distributed to, and executed by, a Superpod worker host. Without concurrent dataflow execution capabilities, every customer organization may have, at most, one single dataflow of any given type running at any given type, due to the risk of write conflicts. Thus, multiple dataflows of the same data type for a single customer organization, which are awaiting execution, necessitates enforcing serialization on such processes so as to eliminate any possibility for write conflicts to that customer organization's data.

Such a restriction, results in long latency times and low throughput for any customer needing to execute multiple dataflows of the same type.

Problematically, it is a technically complex problem to determine which dataflows may be executed concurrently, and therefore, such capabilities were historically not made available to the end user, given that any error results in the concurrently executing dataflows overwriting one another's data, resulting in an out of order data write, data loss, or possibly data corruption.

Agreement and Correctness:

According to described embodiments, multiple dataflows of a same type may execute concurrently on behalf of a single customer organization or other entity and regardless of the quantity of concurrent dataflows executing on behalf of such a customer organization, the result of the datasets should be the same. Stated differently, the quantity of concurrently executing dataflows is of no consequence whatsoever to the resulting datasets. Rather, only functionality of the dataflows themselves affects the outcome of such data sets. Another way to consider such a rule is that serialized execution (e.g., only a single dataflow of a single type shall execute on behalf of a single customer organization at any given time) will output the identical datasets for all serialized dataflows subsequent to execution as will concurrent execution of any number of the dataflows.

If two dataflows are configured to access the same underlying dataset, then any updates resulting from the dataflows to the common dataset must be performed in the order in which the dataflows were requested. Conversely, if multiple dataflows of the same type are to be executed but they do not access or update any common dataset, then the multiple dataflows may be executed concurrently, in any order, because even if the dataflows execute and complete in an order different than their request order, the updates to the underlying datasets will nevertheless be the same.

Therefore, according to described embodiments, an update order is strictly enforced via FIFO (First In First Out) ordering for each and every dataset. Consequently, each and every data set must update it in the same order as the corresponding dataflow request for which it was created. Conversely, while it is mandatory that updates occur in a FIFO order, for the sake of reducing latency, there is no requirement or guarantee that the order of execution of dataflows is in FIFO. According to certain embodiments, therefore, FIFO ordering is enforced for updates to the data sets affected by the dataflows requested for execution whereas the execution of the dataflows themselves are executed out of turn, in an order different than FIFO.

Notwithstanding enforcing a FIFO update order for each dataset, there remains no guarantee that the order of execution of the dataflow is in FIFO order. Consider for example, an execution of concurrent dataflows where a dataflow 1 updates datasets A, B; dataflow 2 updates dataset A; and dataflow 3 updates dataset C. The resulting lock for execution of dataflow 1 will lock both datasets A and B. Therefore, dataflow 2 is blocked as it must update dataset, A which is already locked by dataflow 1. However, dataflow 3 which will seek to update dataset C may still run if the concurrent limit is not yet met for the system as concurrent execution of dataflows 1 and 3 will not break the agreement since no matter what order the dataflows 1 and 3 are executed in [1, 2, 3] or [1, 3, 2], for dataset A, the only update order permitted is dataflow 1 and then dataflow 2. Datasets B and C are updated by single dataflow.

According to such an embodiment, a dataflow is ready for execution within the concurrent dataflow execution environment when each of the following three requirements are met. Specifically, a dataflow is ready for execution when: (1) the dataflow job type falls within allowable system limits; (2) a dataflow with a same dedup key is not already executing; and (3) there are no write conflicts on any data set or data sets touched by the dataflow in question. The dedup key is defined by the dataflow version and is utilized to ensure that the there is not another duplicate dataflow executing at the same time and attempting to access the same common dataset, which may result in a write conflict.

With respect to the first requirement, system limits are provided to protect the back end Superpod workers so as to ensure that system utilization remains within pre-established threshold limits. For instance, a single dataflow may individually consume a very large amount of memory (e.g., upwards of 100 GB) without the concurrent limit restriction. If such a dataflow is serialized, then there is no risk to exhausting the available memory so long as the system is configured with greater than 100 GB in available memory. However, where multiple dataflows are permitted to execute concurrently, it is necessary to check that multiple such dataflows do not cause an "Out of Memory" error due to their aggregate system resource usage of available memory exceeding the configured memory for such a Superpod worker. Therefore, available system resources are checked and compared with a concurrent dataflow execution request before permitting such a dataflow to initiate concurrent execution.

With respect to the second requirement, write conflict inferences are based on "dataset Access," which is a Base Platform Object (BPO), which maintains a record of relationships between the dataflow version and the dataset's API (Application Programming Interface) name. There are two access types: read and write. According to certain embodiments, for user originated dataflows, the dataset access is permitted to have multiple reads and multiple writes, depending on the dataflow definition. Conversely, for system dataflows, there is exactly one write permitted to the datasets.

The dedup key may be dependent upon dataflow version, as well as other related runtime parameters based on the desired implementation.

The dataflow version tracks important details about the dataflow, but critically, maintains a record of which datasets are to be accessed by any given dataflow. The dataflow version therefore is utilized by the distribution engine and concurrency manager 290 to analyze and evaluate where data conflicts may exist based on an overlap or sharing of common datasets, which must be accessed by more than one dataflow.

According to described embodiments, anytime the dataflow definition is updated, a new dataflow version is generated which then records the newest and most up to date dataset access list of any and all datasets that are accessed by the dataflow at the time of execution.

Consider the following table depicting the dataflow versions. For instance, a database table may be established for all versions of a flow, in which versions older than a given threshold or historical retention period (e.g., 90 days, etc.) are automatically cleaned up and removed from the table. According to certain embodiments, the dataflow version may be deleted after a historical retention period, however, the current dataflow version, no matter how old it may be, will always be retained and will therefore not be subject to deletion under such a historical retention period.

According to an exemplary embodiment, dataflow and dataflow version operates as follows: Dataflow contains at least: a Dataflow label, a dataflow type (in which the type is only applicable to dataflow), and creator information, which identifies the specific user having created that particular dataflow, and at what time. Creator information may also contain a current field, which points to the most recent, and up to date dataflow version. In a complementary manner, the Dataflow version Base Platform Object (BPO) includes at least: a dataflow definition, a schedule, and notification info. Updateable portions of the dataflow are defined by the dataflow version while the dataflow version BPO is itself, immutable. As such, any update to the dataflow version BPO will automatically result in the creation of a new dataflow version and the dataflow itself will therefore be pointing to the newly created and latest dataflow version subsequent to such an update to dataflow version. In such a way, the immutability of the dataflow version preserves all modification history.

Exemplary DATAFLOW_VERSION table:

| DATAFLOW_VERSION | | |
|---|---|---|
| Id | PK | |
| Dataflow | MASTERDETAIL | Parent ID |
| Definition | JSON | Dataflow nodes JSON |
| RuntimeParams | JSON | RuntimeParams from config files |
| CronExpression | String | Quartz cron expression |
| CronTimeZone | ENUM | TimeZoneSidKey |
| NotificationEmail | String | Email address or User Id |
| NotificationSent | ENUM | ALWAYS, FAILURES, WARNINGS, NEVER |

According to the described embodiments, dataflows having different types are logically isolated and therefore, absent a violation of the above conditions, they may run concurrently with any data flow of a different type or may run concurrently with additional dataflows of a same type. According to certain embodiments, both user and system dataflow concurrent limits are associated with an org value representing a particular customer organization, entity, etc. However, concurrency limits may be associated with other parameters, such as subscription tier levels, dataflow object type, user type, etc. For instance, exemplary max concurrent dataflow values applied to any system dataflow limit may be, for instance, "5," where as the corresponding max concurrent user dataflow limit is configured as "2," however, other limits, conditions, and rules may be configured as well. According to such embodiments, any user dataflow concurrent limit (e.g., "2" or otherwise) is based on an evaluation and analysis conducted by a performance engineer responsible for tuning the systems. For instance, where memory consumption is the bottleneck for the system, the performance engineer may base the user concurrency limit on memory consumption. Similarly, an exemplary system dataflow concurrency limit (e.g., "5" or otherwise) may be based on the performance engineer's evaluation of performance as affected by the system's concurrent requests, and therefore, once again be based on analysis and evaluation of the system. Simply stated, the currency limits are not hard set, random, or arbitrary numbers, but rather, are based on observation, tuning, and evaluation of the system's performance when current dataflow execution on the system is enabled and utilized.

Figure 2B:
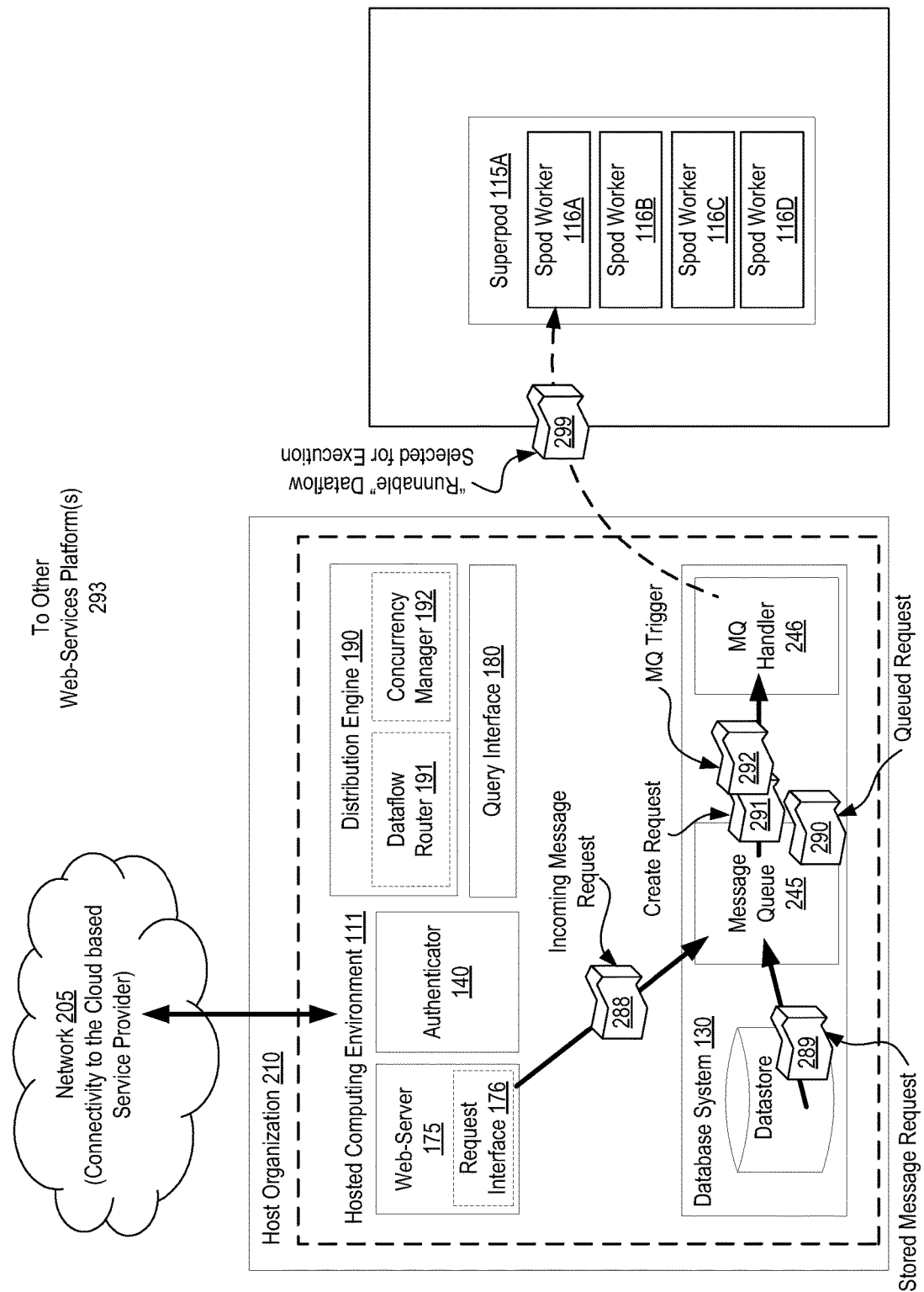
FIG. 2B depicts another exemplary architecture performing the dataflow instance creation process in accordance with described embodiments.

FIG. 2B depicts another exemplary architecture 202 performing the dataflow instance creation process in accordance with described embodiments.

All dataflow execution events begin started with the creation of a flow request. Creation of a flow request implies a queued request as having been scheduled for execution at a given time or condition or as having been requested ad-hoc for immediate execution. For instance, such an incoming message request 288 may originate via the request interface 176 of the hosted computing environment or may have been previously scheduled for execution at a specific time, and stored within the database system 130 as a stored message request 289.

Any request without an assigned flow instance id is considered a queued request 290, as may be observed within the message queue 245. A create request 291 transaction is a simple database transaction with no other synchronization. Upon request creation (transaction 291), a message queue (MQ) action trigger 292 is also sent. Once the MQ handler 246 receives the create request 291 for a dataflow corresponding to the queued request 290, the MQ handler 246 will then begin selection of the queued request's dataflow for execution.

The message queue 245 additionally provides fault tolerance as any dataflow job requested by the customer is enqueued into the message queue 245 and may therefore be dealt with asynchronously, without the customer having to wait for completion of the dataflow requested. Additionally, if there is a need to delay or abort a dataflow request, then the message queue 245 and message handler 245 enable the dataflow request to simply be retained within the message queue 245 (e.g., not dequeued) or to be requeued within the message queue 245.

According to described embodiments, the message queue 245 tracks all dataflows pending in the queue. Therefore, at the time of dataflow selection, the message queue handler 246 (or multiple message queue handlers), each executing as a Java thread, will query for a data ascending list of all dataflow requests may be queried so as to identify all queued dataflows, within which the system can then identify the first runnable dataflow allowed to be executed for a given dataflow type. Such a query may be constructed as, for example: sql: select*from dataflow request where state=new order by creation date asc. In such a way, the returned result set will be ordered in such a way that the earliest requested dataflow of the correct type may be quickly identified and selected for execution.

According to certain embodiments, selection of a queued request's 290 dataflow to run or execute is performed via a query on a request table stored within the database system 130 representing all queued requests 290, which is in strictly FIFO order (by created date) to identify the first "runnable" flow stored within the request table.

As described briefly above, a runnable flow which meets all of the following three conditions: (1) a dataflow which is allowed by system limits for the job type; (2) a dataflow verified to not have a same dedup key is not already running; and (3) a dataflow for which there are no write conflicts on datasets touched by the dataflow in question.

The above three criteria are utilized for both pre and post validation, ensuring that a selected dataflow is in a "runnable" condition (element 299) and may thus be routed and assigned for execution via the Superpod 115A and its Spod worker nodes 116A-D.

While any update of the datasets is required to be strictly in FIFO order, there is the possibility of failures and/or exception conditions given that the execution of such dataflows may not necessarily be in FIFO order.

According to described embodiments, where failures and/or exceptions occur, any failed dataflow instance is marked failed with detailed error message(s). The system then proceeds with processing of the next dataflow request 290 by selecting the next runnable dataflow selected for execution 299.

In the event that all available slots for a specific type within the message queue are exhausted (e.g., permissible additional slots has dropped to 0), then the queue is dropped and the system then proceeds with selecting other dataflow types from the message queue for concurrent dataflow execution via the superpod 115A or other computational means.

Should any violation occur in pre or post validation for any of the above three criteria of the runnable dataflows, then the system will simply error out by dropping any queued request 290 for that selection cycle, thus negating potential execution of that particular queued dataflow request 290 at that time, but permitting such a queued dataflow request to remain queued such that it may be selected for execution as a runnable dataflow 299 at a later time, when each of the three criteria may be verified as passing during both pre and post validation checks.

According to certain embodiments, any datasets that are to be accessed by a dropped dataflow are subjected to a "soft freeze." According to such an embodiment, soft freezed datasets are made inaccessible during a current thread, yet may be available for next run or runnable dataflow selection cycle. Such a soft freeze is utilized to distinguish the freeze by dataset access. For instance, such a soft freeze may be set for only a single round of request dequeue during which a runnable dataflow is selected for execution from the message queue 245.

According to another embodiment, when system limits are reached for any given dataflow type, the message handler ceases to check the message queue for available dataflow requests so as to eliminate the overhead associated with checking and monitoring the message queue. However, once system limits are no longer 0, that is, once slots are again available for a given dataflow type in accordance with the prescribed system limits, then the message handler will again resume checking the message queue for available dataflow requests of the given dataflow type.

Consider the following example. Assume there are three dataflows: dataflow 1, dataflow 2, and dataflow 3. Consider that dataflow 1 accesses each of datasets A and B; while dataflow 2 accesses each of datasets B and C; and lastly dataflow 3 accesses only dataset C. Once dataflow 1 is selected for execution as a runnable dataflow 299 and is running, it establishes a lock due to its dataset access of datasets A and B, and thus is blocking dataflow 2 which must also access dataset B as well as non-blocked dataset C. However, dataflow 3 may run without any soft freeze given that dataflow 3 accesses only dataset C. Consequently, dataflow 2 will eventually be permitted to run after the completion of dataflow 1. If run in a serialized manner, dataset C will therefore have update results of dataflow 2 rather than dataflow 3, however, with the soft freeze, because dataflow 2 is dropped, datasets B and C are locked. Dataflow 3 will therefore be blocked and therefore dropped as well, forcing return of the queued request 290 corresponding to dataflow 3 back into the message queue for at least that selection cycle. In such a way, the mandatory FIFO order all updates of datasets is preserved.

Once a final flow candidate is selected and has passed both pre and post validation, it will generate and send a redis payload and mark the dataflow instance as queued. Lastly, as part of final commit processing, all qualifying dataflow requests (e.g., any duplicates) are assigned the instance id.

According to described embodiments, the concurrency manager 192 may implement an optimistic locking protocol, also referred to as Optimistic Concurrency Control (OCC). Such an optimistic locking protocol provides a concurrency control method, which may be applied to transactional systems such as relational database management systems and software transactional memory. According to certain embodiments, the optimistic locking protocol assumes that multiple transactions may frequently complete without interfering with each other, notwithstanding the above noted risk of conflict. Therefore, while running, transactions may utilize use data resources without acquiring locks on those resources. However, prior to committing any completed transaction or dataflow, each such transaction or dataflow must first verify that no other transaction or dataflow has modified the data it has read. If the check reveals conflicting modifications, then the committing transaction rolls back, is re-queued, and may thus be selected for execution at a later time.

When utilized in a low data contention environment, where conflicts are possible but rare, transactions may complete without the time and computational overhead expenses associated with managing locks and without necessitating queued dataflows and pending transactions wait for the locks of other processing dataflows and transactions to clear. In such a way, latency is reduced and throughput is greatly increased.

Pre and Post Validation:

According to described embodiments, implementation of the optimistic locking protocol mandates use of both the pre and post validation routines. Both pre and post validation are utilized to validate the same runnable flow conditions with slightly different values. The purpose of the validation is to guarantee no conflicting flows passed post validation at the same time. In particular, Condition 1 guarantees there is no violation of the flow limits; Condition 2 guarantees there are no dataflows associated with the same dedup key running at the same time and Condition 3 guarantees there are no write conflicts. Notwithstanding these conditions, it is nevertheless possible that two dataflow instances both back off during post validation and wait for the next round of retry to be picked up as a runnable dataflow selected for execution. Since the dequeue may occur whenever a flow completes, a request is generated or every few minutes, for instance by waveDataflowMonitor or another data monitoring utility.

During pre validation of a selected dataflow for execution, a transient instance of the dataflow is created which can be seen by other threads. Each isolated thread faces the same queued list of requested data flows, and there is a chance that more than one thread will select the same dataflow for execution at the same time. Therefore, it is only possible to create instances via the transient instance, which is viewable to other threads, and therefore, other threads may perform pre and post validation to ensure that duplicate instances are not created and executed for a single dataflow request.

Use of the pre and post validation permits utilization of optimistic locking which then permits multiple simultaneously executing threads to each communicate with the same BPO and attempt to create instances for executing selected dataflows. During post validation, the dedup key will be checked to ensure that another thread did not also create an instance for an identical selected dataflow, as doing so will cause post validation to fail upon observation of the transient thread created by the other thread. In such a way, optimistic locking may be applied while ensuring that a maximum of one instance for any dataflow request is ultimately created and released for execution via the Superpod.

Write Conflict Checking:

There are two types of freezes on datasets, a hard freeze and a soft freeze. A hard freeze refers to an attempt-to-lock dataset that is being accessed by a dataflow instance in a running state or if not explicitly specified, then the running state shall include also any "NEW" state. Conversely, a soft freeze is a strictly incremental set and refers to an attempt-to-lock dataset that is to be accessed by a dataflow to which a current thread has aborted during pre and/or post validation, resulting in the dataflow being requeued in the message queue 245 without executing and therefore without performing its updates to the dataset to be accessed.

According to described embodiments, multiple distinct dataflow types may utilized the same message queue 245. Notably, however, different types of dataflows may each have unique and different system limits and therefore, when limits are met for a first dataflow type, they are likely not met for other dataflow types, and therefore, dataflows requests may still be pulled from the message queue 245 for the alternative dataflow types when the system limits are not zero. There dataflow types can, however, conflict in terms of the dataset being accessed by the individual dataflows, which is why it is necessary to ensure that besides the system limits, there are is no other dataflow which may constitute a write conflict to a dataset touched or accessed by the dataflow in question.

During pre and post validation, the dataset access of the current attempted dataflow instance is examined first. All datasets the dataflow is to update or write to are maintained within a list and the system retrieves all dataflow instances having a running state, examines the datasets those running instance dataflows are accessing, and if there is any overlap, sharing, or potential write conflicts between transient instances of dataflows and current incomplete instances of dataflows, then a write conflict is determined to exist, necessitating that post validation shall fail, resulting in the current instance dataflow being aborted (and re-queued) and thus having to retry later. This is referred to as a write conflict due to the hard freezing on datasets.

Dataflow requests may be aborted in different ways according to the described embodiments. The term aborted does not mean that the dataflow will not be executed, but rather, must be delayed and retried later. Aborted dataflow instances are differentiated from failed instances, which are considered as, serviced (despite having failed) and will therefore not block any other instance from running. Moreover, any dataflow request that is aborted and re-queued will preserve the original creation time stamp, regardless of the number of times such a request is attempted and aborted. According to certain embodiments, such an "aborted" request may not be re-queued after a failed attempt, but rather, simply not acted upon in any way and thus, the dataflow requests simply remains in the queue awaiting action, and thus, the creation time stamp is again preserved, as no action is taken, and the dataflow request's position remains preserved within the queue as the dataflow request is never de-queued and thus does not need to be re-queued. For example the system may perform a query operation such as "select*from dataflow request where status=new order by creation time asc" to reprocess an aborted request again without altering its creation datetime.

Aborting a dataflow may be attributable not to an actual concurrency violation in which two dataflows cannot permissibly be run simultaneously, but rather, attributable to a concurrent limit restriction or attributable to a pre and/or post validation failure. Where such a dataflow is aborted in such a way, all datasets to be accessed by that dataflow are then soft freezed. If other dataflows were permitted to access those soft freezed datasets, which are to be accessed by the aborted dataflow, then the dataset updates may violate the FIFO dataset update mandate, resulting in writes and updates to such datasets being out of order.

Correctness Proofs:

Provided here are multiple proofs for correctness in various situations that may occur with concurrent dataflow execution as managed by the concurrency manager 192.

Consider for instance a single thread situation where a dataflow updates a number of open datasets, which are not soft or hard freezed. The dataflow updates will not break FIFO order on any datasets. Proof: Because there is a single dataflow 1 thread accessing datasets X, Y, Z; where all three datasets are neither soft nor hard freezed, dataflow 1 will not violate the FIFO order of datasets X, Y, Z update.

Assume for contradiction, that the related datasets to be accessed by dataflow 1 has neither soft nor hard freezes but it will break FIFO order on one of the datasets. For this to be true, then a dataflow 2 exists and dataflow 2 has a request time is earlier than dataflow 1 and will update datasets X. Because dataflow 2 is before dataflow 1, it has three possibilities: (1) First, dataflow 2 is executed first and finished first, and then updates from execution of dataflow 1 on datasets X are by definition in compliance with the FIFO update order mandate. (2) Secondly, dataflow 2 may be executed first and still in progress, in which case dataset X is hard freezed, and is thus a contradiction. (3) Third, it is possible that dataflow 2 is aborted and dataset X is soft freezed, and is thus again a contradiction. Therefore, correctness is proved.

Consider an alternative queue of dataflow requests, which is processed in the following manner. For each dataflow request: (1) If datasets the dataflow attempted to edit is not freezed, then the dataflow shall proceed to execution; (II) if, however, datasets the dataflow attempted to edit is freezed, then the dataflow request is aborted and a soft freeze is placed onto datasets associated with that dataflow request; and (III) for every running dataflow, a hard freeze is placed onto the datasets associated with the running dataflow. Consequently, the FIFO order of any datasets update is strictly preserved.

Dataflow without execution will not update datasets. Therefore, for every dataflow request, the only way for the dataflow to be executed is satisfy condition 1. In the first example, condition 1 is proved to will always preserve the FIFO order on any datasets. Therefore, the system will preserve the FIFO order of dataset update. Therefore, correctness is proved.

Consider now a multi-threaded situation as a third example. If any single thread execution is in strictly FIFO order for datasets update, and all threads sharing the same queue of dataflow requests, the multi thread execution is in strictly maintained in FIFO order on dataset updates as well.

Consider a dataflow request queue with dataflows [I, II] each of which are to update the same dataset A. Assume for contradiction that thread I executed dataflow request II first, and then thread 2 executed the dataflow request I subsequently. Because thread I is in strictly FIFO order. Dataflow request I must be executed and completed before the execution of dataflow request II. By the time, thread 2 reaches dataflow request I, execution of dataflow request II is subsequent to execution of dataflow request II on thread 1, because dataflow request I is already in a serviced state, having been previously completed. If, however, dataflow request I comes prior to the execution of the dataflow request II, then simply do not hold. Therefore, correctness is proved.

FIGS. 3A, 3B, 3C, and 3D depict various concurrent execution path scenarios of the dataflows as managed by a concurrency manager 390 in accordance with described embodiments.

Figure 3A:
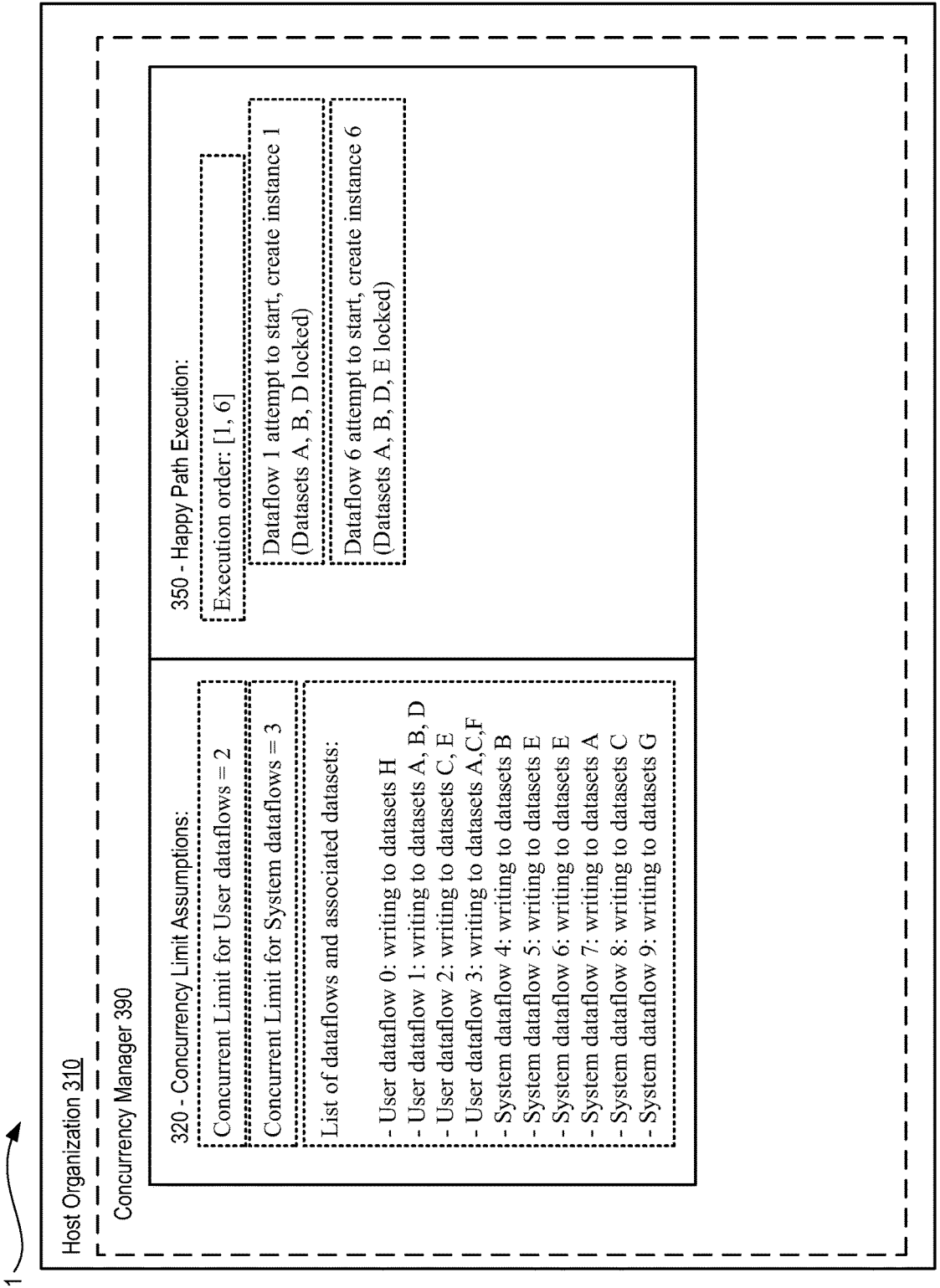
FIGS. 3A, 3B, 3C, and 3D depict various concurrent execution path scenarios of the dataflows as managed by a concurrency manager in accordance with described embodiments.

Beginning with FIG. 3A at element 301, there is a host organization depicted having the previously described concurrency manager 390 operating therein. According to the depicted concurrent execution path scenario, the following concurrency limit assumptions 320 are in place, for the sake of the provided example: The concurrency limits assume the concurrent limit of user dataflows is 2, and further that the concurrent limit of system dataflows is 3.

The following dataflows and associated datasets are operated upon and are applicable and identical for each of the various concurrent execution path scenarios illustrated by each of FIGS. 3A, 3B, 3C, and 3D:

User dataflow 0: writing to datasets H.
User dataflow 1: writing to datasets A, B, D.
User dataflow 2: writing to datasets C.
User dataflow 3: writing to datasets A, C, F.
System dataflow 4: writing to datasets B.
System dataflow 5: writing to datasets E.
System dataflow 6: writing to datasets E.
System dataflow 7: writing to datasets A.
System dataflow 8: writing to datasets C.
System dataflow 9: writing to datasets G.

Element 350 depicts a "Happy path" execution scenario having an Execution order: [1, 6] within which Dataflow 1 attempts to start, creates instance 1, resulting in Datasets A, B, D being locked. Next, Dataflow 6 attempts to start, creates instance 6, resulting in Datasets A, B, D, E being locked.

Figure 3B:
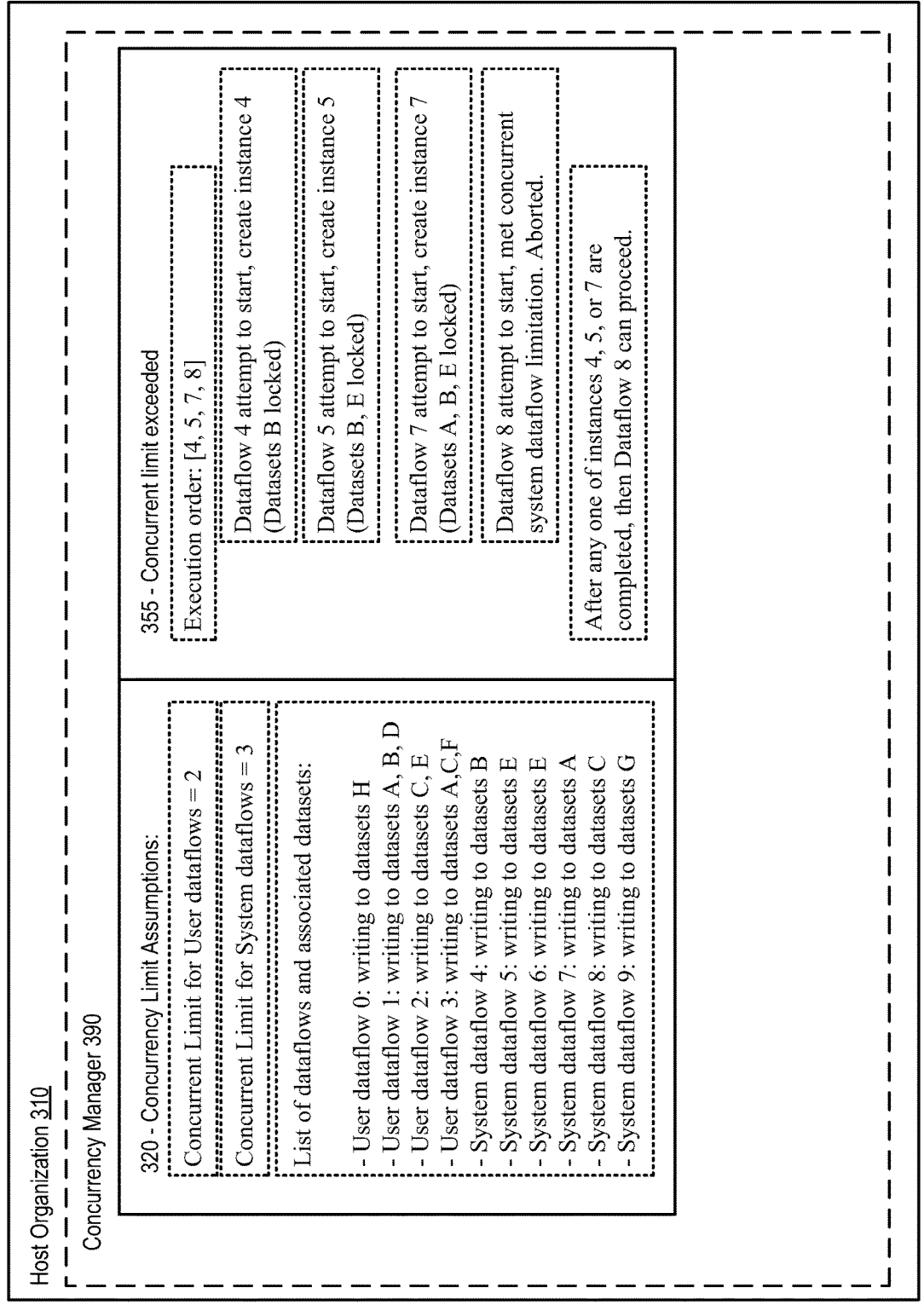

Turning to FIG. 3B at element 302, the concurrency manager 390 operates upon the identical assumptions, dataflows and associated datasets as above.

Depicted at element 355 is a "Concurrent limit exceeded" execution scenario having Execution order: [4, 5, 7, 8] within which Dataflow 4 attempts to start, creates instance 4, resulting in Datasets B being locked. Dataflow 5 attempts to start, creates instance 5 resulting in Datasets B, E being locked. Dataflow 7 attempts to start, creates instance 7 resulting in Datasets A, B, E being locked. Dataflow 8 attempts to start, meets the concurrent system dataflow limitation of 3 and is consequently Aborted. Once any of instances 4, 5, 7 are completed, then Dataflow 8 can proceed.

Figure 3C:
Figure 3C:
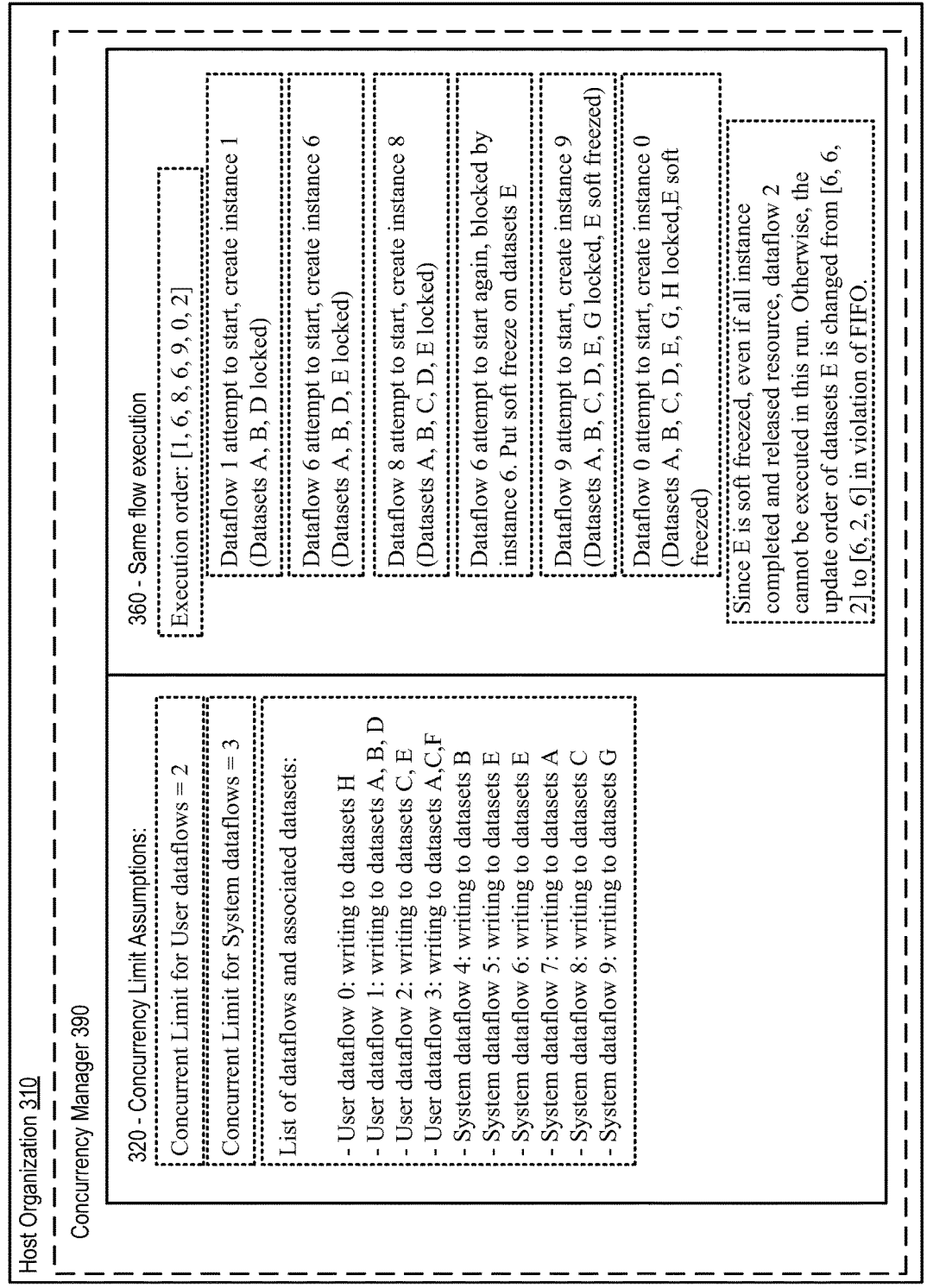

Turning to FIG. 3C at element 303, the concurrency manager 390 operates upon the identical assumptions, dataflows and associated datasets as above.

Depicted at element 360 is a "Same flow execution" scenario having Execution order: [1, 6, 8, 6, 9, 0, 2]. Dataflow 1 attempts to start, creates instance 1 resulting in Datasets A, B, D being locked. Dataflow 6 attempts to start, creates instance 6 resulting in Datasets A, B, D, E being locked. Dataflow 8 attempts to start, creates instance 8 resulting in Datasets A, B, C, D, E being locked. Dataflow 6 attempts to start again, but is blocked by instance 6 and a soft freeze is therefore placed upon on dataset E. Dataflow 9 attempts to start, creates instance 9 resulting in Datasets A, B, C, D, E, G being locked, with E soft freezed. Dataflow 0 attempts to start, creates instance 0 resulting in Datasets A, B, C, D, E, G, H being locked, with E soft freezed. Since E is soft freezed, even if all instances completed and released resources, Dataflow 2 cannot be executed in this run. Otherwise, the update order of datasets E is changed from [6, 6, 2] to [6, 2, 6] in violation of FIFO update ordering requirements.

Figure 3D:
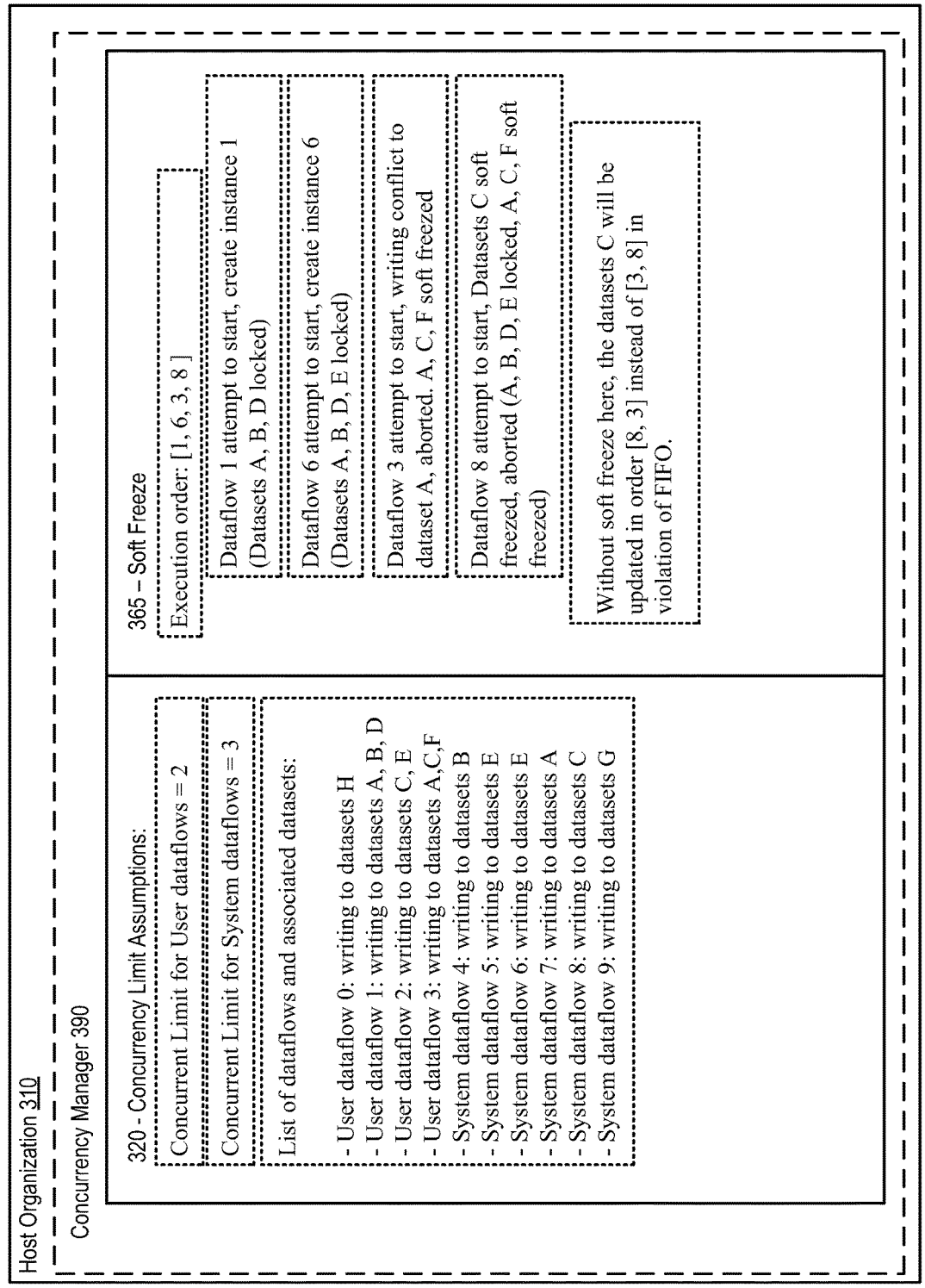

Turning to FIG. 3D at element 304, the concurrency manager 390 operates upon the identical assumptions, dataflows and associated datasets as above.

Depicted at element 365 is a "Soft freeze" execution scenario having Execution order: [1, 6, 3, 8]. Dataflow 1 attempts to start, creates instance 1 resulting in Datasets A, B, D being locked. Dataflow 6 attempts to start, creates instance 6 resulting in Datasets A, B, D, E being locked. Dataflow 3 attempts to start, resulting in a writing conflict to dataset A, and is therefore aborted, with Datasets A, C, F soft freezed. Dataflow 8 attempts to start with Dataset C soft freezed, and is therefore aborted with Datasets A, B, D, E locked and Datasets, A, C, F soft freezed. Without the soft freeze, the datasets C will be updated in order [8, 3] instead of [3, 8] in violation of the FIFO update requirements.

Figure 4A:
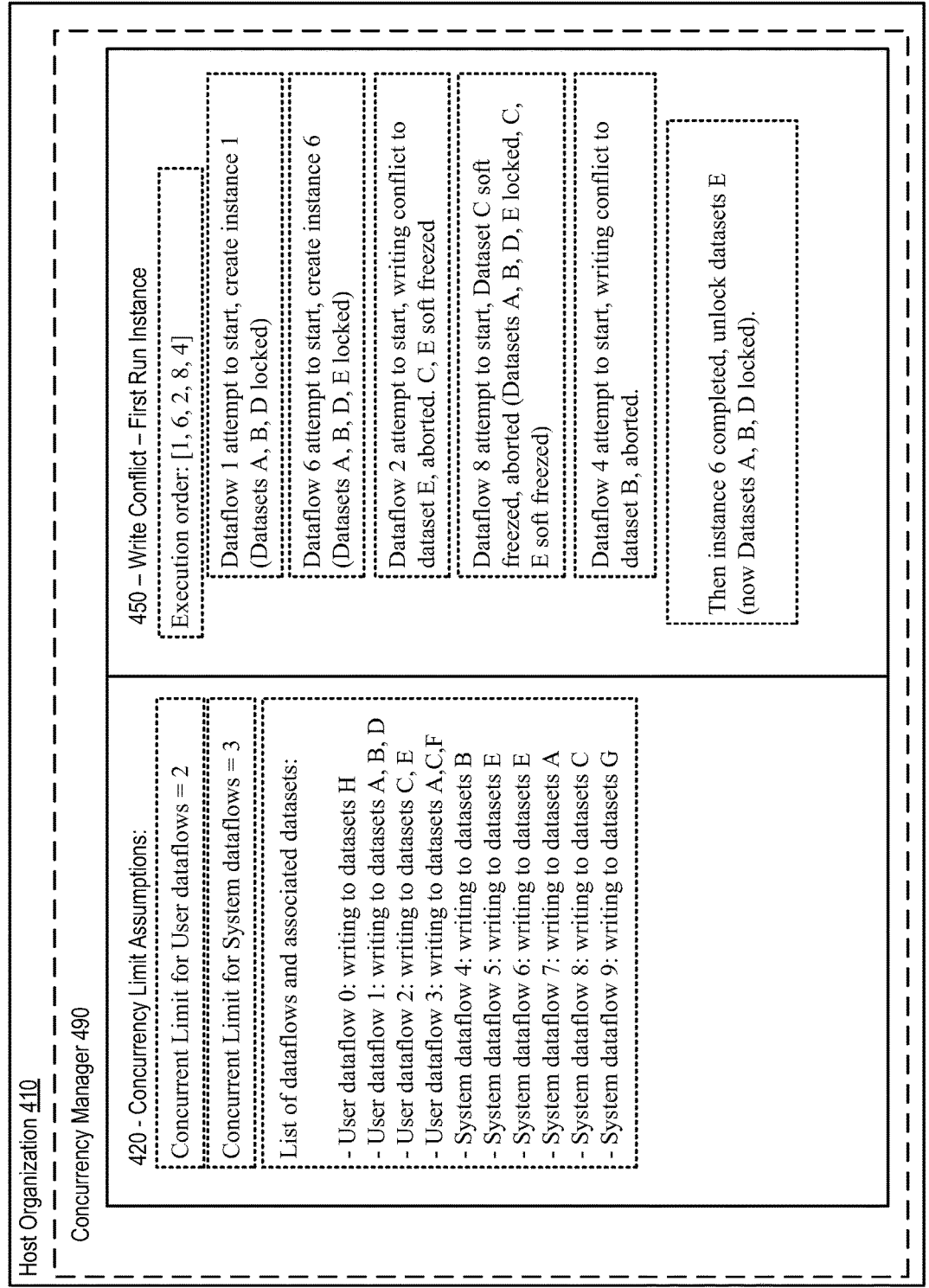
FIGS. 4A, 4B, and 4C depict several write conflict run instances in fulfillment of the queued dataflows as managed by a concurrency manager in accordance with described embodiments.
Figure 4B:
Figure 4B:
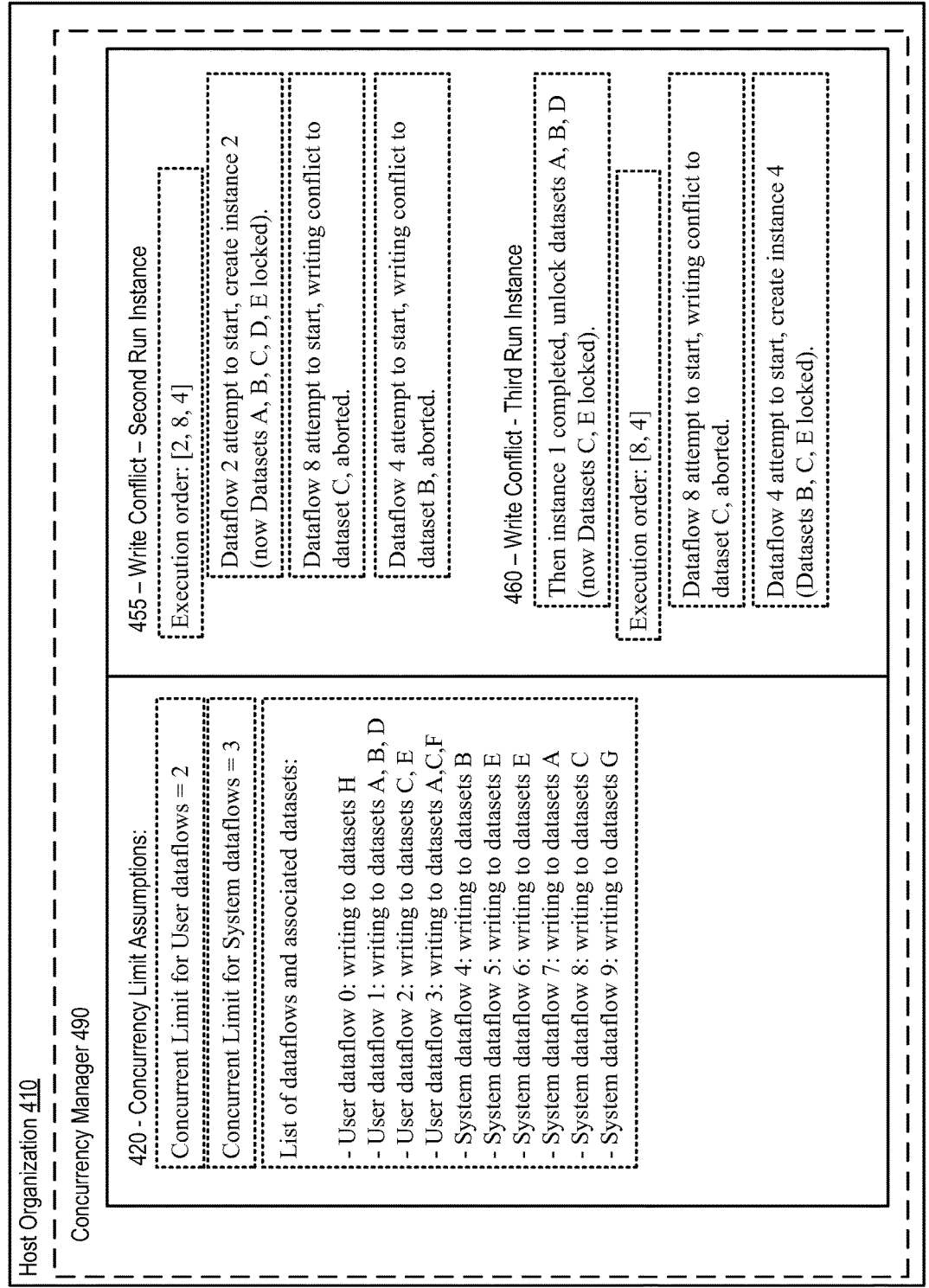
Figure 4C:
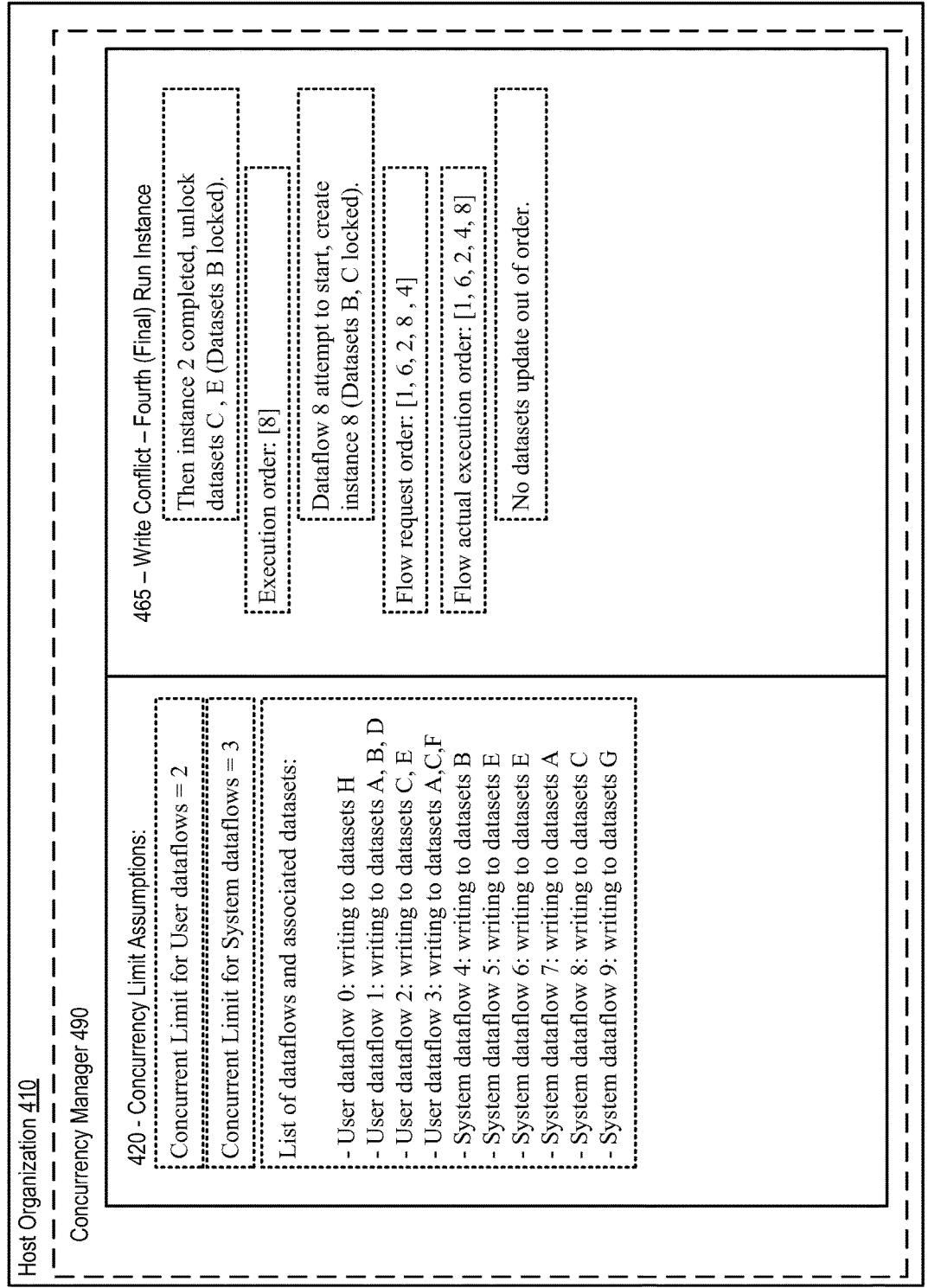

FIGS. 4A, 4B, and 4C depict several write conflict run instances in fulfillment of the queued dataflows as managed by a concurrency manager 490 in accordance with described embodiments.

Beginning with FIG. 4A at element 401, there is a again host organization depicted having the previously described concurrency manager 490 operating therein. Each of the depicted write conflict run instances as depicted at FIGS. 4A, 4B, and 4C utilize the identical assumptions, dataflows and associated datasets as above with respect to the execution scenarios as depicted at FIGS. 3A, 3B, 3C, and 3D.

Depicted at element 450 is the write conflict first run instance having an Execution order: [1, 6, 2, 8, 4]. Dataflow 1 attempts to start, creates instance 1 resulting in Datasets A, B, D being locked. Dataflow 6 attempts to start, creates instance 6 resulting in Datasets A, B, D, E being locked. Dataflow 2 attempts to start, resulting in a writing conflict to dataset E, and is therefore aborted with Datasets C, E soft freezed. Dataflow 8 attempts to start, however, Dataset C is presently soft freezed, and the Dataflow 8 attempt is therefore aborted, resulting in Datasets A, B, D, E being locked and Dataflows C, E soft freezed. Dataflow 4 attempts to start, resulting in a writing conflict to Dataset B, and is therefore aborted. Next, instance 6 completes, resulting in the unlocking of Dataset E, with Datasets A, B, D remaining locked.

Depicted at element 455 is the write conflict second run instance having an Execution order: [2, 8, 4]. Dataflow 2 attempts to start, creates instance 2 while Datasets A, B, C, D, E remain locked. Dataflow 8 attempts to start, resulting in a writing conflict to dataset C, and is therefore aborted. Dataflow 4 attempts to start, resulting in a writing conflict to dataset B, and is therefore aborted.

Depicted at element 460 is the write conflict third run instance in which instance 1 completes and unlocks datasets A, B, D while Datasets C, E remain locked. Execution order for the third run instance is [8, 4]. Dataflow 8 attempts to start, resulting in a writing conflict to dataset C, and is therefore aborted. Dataflow 4 attempts to start, creates instance 4 resulting in Datasets B, C, E being locked.

Depicted at element 465 is the write conflict fourth (and final) run instance in which instance 2 completes and unlocks datasets C, E while Dataset B remains locked. Execution order for the fourth and final run is: [8] Dataflow 8 attempts to start, creates instance 8 resulting in Datasets B, C being locked. The flow request order is: [1, 6, 2, 8, 4] and the flow actual execution order is: [1, 6, 2, 4, 8] No datasets are updated out of order.

Logging For Concurrent Execution:

According to described embodiments, logging of concurrent dataflow execution is provided in user friendly logs, with the design of the logging being such that, from the logs alone, a programmer is able to understand what has happened. Basic log info is produced based on each none-soft-frozen request. In order to link each individual request dequeue log to get a full mapping, a ThreadId and log creation time is captured, with the basic concurrent dataflow related info including the following fields: isSuccess, message, number of requests, and queue logs dump. Inside the queue logs dump, dataflowRequestId, dataflowVersionId, isSoftFreezed, dataflowLabel and associateDatasets are included. For "Happy path" execution scenarios, isSuccess is true is captured (it is false for rest of scenarios), with Message is orig open slots by flow=X QueueLogDump.isSoftFreezed=false, and QueueLogDump size is 1.

For Soft freezed requests, because soft freezed requests are not attempted to start, it is only recorded inside the queueLogDump that the request existed. Until a non-soft-freeze request is met, the request queue will continue to bypass the requests which are soft freezed. Consider the following example, in which Datasets A is soft freezed, and within the request queue, there are queued dataflows [1, 3, 5]. Each of Dataflows 1 and 3 are writing to Dataset A. Dataflow 5 has no write conflict and Upon one dequeue, isSuccess, message, number of requests, etc are entirely describing Dataflow request 5 since Dataflow request 5 is the Dataflow attempted for execution. However, QueueLogDump contains three records, one record for each of Dataflows 1, 3 and 5. QueueLogDump.isSoftFreezed is true for 1 and 3, false for 5.

For Hard freezed requests, an attempt to run Hard freezed requests will be made and therefore, isSuccess is false and the message is "request aborted due to pre/post validation failure" or something equivalent.

Alternatively, where there is no available slot for a dataflow type, the message will contain: request aborted due to no available slot for dataflowType User/System/Extract etc.

Figure 5:
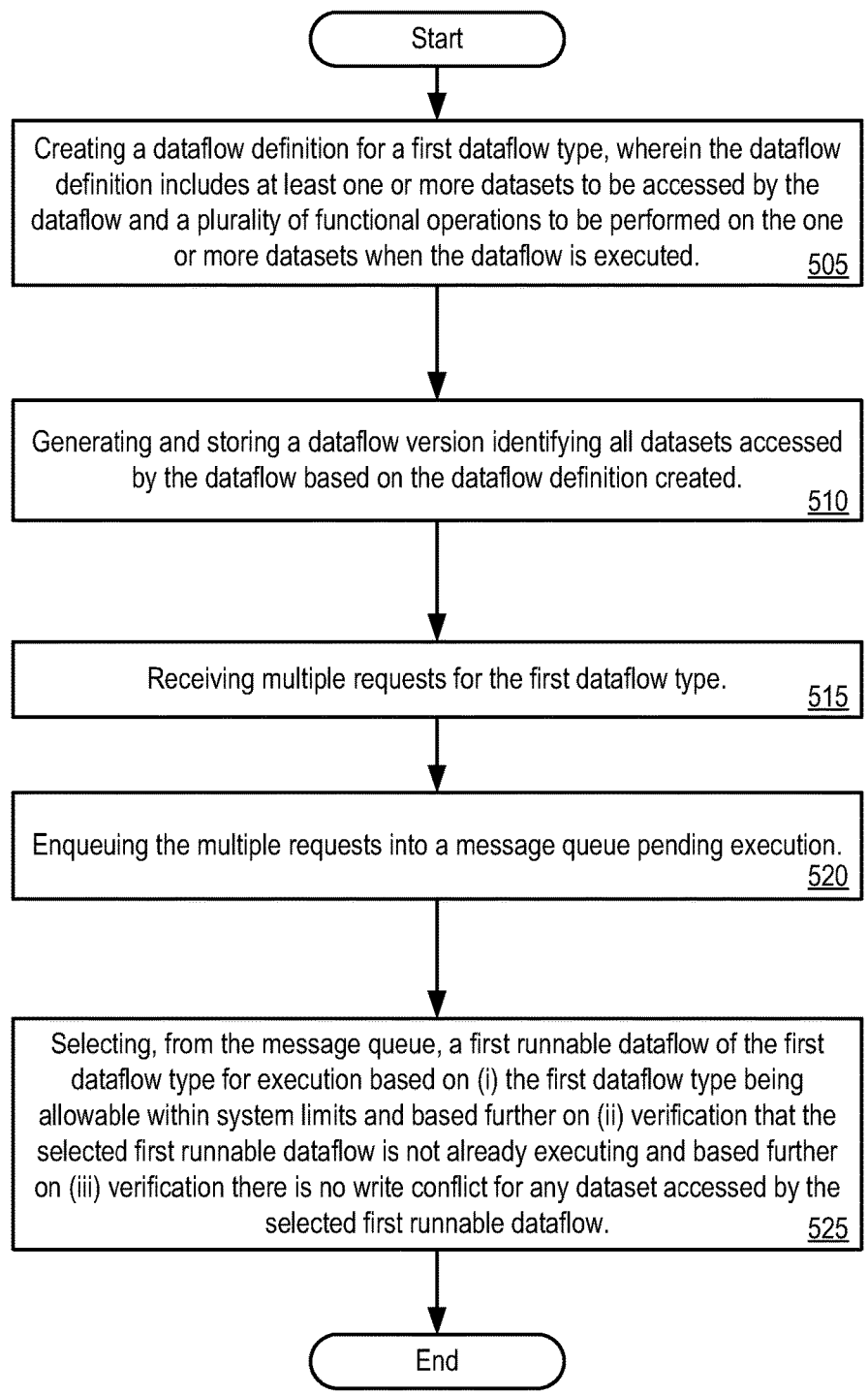
FIG. 5 depicts a flow diagram illustrating a method for implementing concurrent dataflow execution with write conflict protection within a cloud based computing environment in accordance with disclosed embodiments.

FIG. 5 depicts a flow diagram illustrating a method 500 for implementing concurrent dataflow execution with write conflict protection within a cloud based computing environment in accordance with disclosed embodiments. Method 500 may be performed by processing logic that may include hardware (e.g., circuitry, dedicated logic, programmable logic, microcode, etc.), software (e.g., instructions run on a processing device) to perform various operations such as creating, generating, receiving, enqueuing, selecting, designing, defining, retrieving, parsing, persisting, exposing, loading, executing, operating, storing, maintaining, returning, presenting, interfacing, communicating, transmitting, querying, processing, providing, determining, triggering, displaying, updating, sending, etc., in pursuance of the systems and methods as described herein. For example, the hosted computing environment 111, the web-distribution engine 190, and its database system 130 as depicted at FIG. 1, the database system 130 and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 500 depicted at FIG. 5, at block 505, processing logic creates a dataflow definition for a first dataflow type, wherein the dataflow definition includes at least one or more datasets to be accessed by the dataflow and a plurality of functional operations to be performed on the one or more datasets when the dataflow is executed.

At block 510, processing logic generates and storing a dataflow version identifying all datasets accessed by the dataflow based on the dataflow definition created.

At block 515, processing logic receives multiple requests for the first dataflow type.

At block 520, processing logic enqueues the multiple requests into a message queue pending execution.

At block 525, processing logic selects, from the message queue, a first runnable dataflow of the first dataflow type for execution based on (i) the first dataflow type being allowable within system limits and based further on (ii) verification that the selected first runnable dataflow is not already executing and based further on (iii) verification there is no write conflict for any dataset accessed by the selected first runnable dataflow. For instance, such processing logic may select from the enqueued dataflow requests within the message queue, the first runnable dataflow having been earliest enqueued into the message queue of the first dataflow type based on the above criteria, such that the selected earliest enqueued dataflow of that type may then be executed via the computing architecture of the Superpod or host organization computing architecture.

According to another embodiment of method 500, enqueuing the multiple requests into a message queue includes enqueuing the multiple requests of different dataflow request types together into the message queue; and further in which the message queue having the multiple requests of different dataflow request types enqueued therein applies different concurrency limits to each different dataflow request type.

According to another embodiment, method 500 further includes: receiving multiple requests for a second dataflow type, different than the first dataflow type; enqueuing the multiple requests for the second dataflow type into the message queue pending execution; and selecting one or more of the second dataflow types for execution based on a determination that the selected second dataflow type does not have a write conflict for any dataset accessed by the selected first runnable dataflow of the first dataflow type.

According to another embodiment, method 500 further includes: sending, via a distribution engine, the selected first runnable dataflow for execution to one of a plurality of Superpod worker nodes within a Superpod, in which the Superpod is isolated from a plurality of customer organizations accessing the system and further in which the Superpod accepts customer requested dataflows from the distribution engine subject to system limits.

According to another embodiment of method 500, selecting a first runnable dataflow for execution based on the first dataflow type being allowable within system limits includes: the selecting being allowable based on a quantity of concurrent dataflow executions for the first dataflow type; the selecting being allowable based on a quantity of concurrent dataflow executions for a customer organization having requested execution of the dataflow, when the first dataflow type is determined to be a user dataflow request; the selecting being allowable based on a quantity of concurrent dataflow executions of the first dataflow type for the system, when the first dataflow type is determined to be a system dataflow request. According to such an embodiment, the determination of whether any given dataflow request is a user dataflow request or a system dataflow request is not based on dataflow type, but rather, is based on the dataflow version. The dataflow request must contains all information, which is to be executed, otherwise the corresponding dataflow would have to be locked until the current request completes, and is therefore associated with dataflow version. As described herein, such a dataflow version is immutable and contains all the requisite Directed Acyclic Graph (DAG) transformation and input/output datasets. Consider for instance a dataflow with a current version dfv1, which is to write to Dataset A. To run the dataflow, it is queued via a dataflow request for df-v1. Once the request is queued, which would typically take less than few seconds, the dataflow may then be modified to any other dataflow version desired (e.g., new df-v2, df-v3, df-v4, etc.) without the need to wait for first version (df-v1) to run and finish, as the dataflow request's original association with df-v1 will remain unchanged. Moreover, it is possible for customers to have dozens of dataflows of a same dataflow type, and therefore, the dataflow request is associated with the dataflow type based on the precise dataflow version in effect at the time the dataflow is to be executed on behalf of such a customer.

According to another embodiment of method 500, the first dataflow type includes one of: a user defined dataflow having a fixed payload stored in a database of the system; and a system defined dataflow having a dynamically generated payload retrieved at runtime of the dataflow by the system.

According to another embodiment of method 500, selecting, from the message queue, a first runnable dataflow of the first dataflow type for execution includes: querying the message queue from a message handler for all enqueued dataflow requests of all dataflow types, ordered by creation date; identifying an earliest one of the enqueued dataflow requests that meet all of the following criteria: (i) sufficient slots remain in accordance with the system limits to begin execution of the earliest identified dataflow requests, (ii) the earliest identified dataflow request is verified to not already be executing based on a dedup key, (iii) the earliest identified dataflow is verified to have write conflicts on any dataset touched by any other dataflow presently executing via the system.

According to another embodiment, method 500 further includes: verifying a FIFO (First In First Out) update order is enforced for updates to any dataset accessed by the dataflow selected for execution based on creation date of the dataflow request associated with the dataflow to be executed; and delaying execution by re-queuing the dataflow request selected for execution when the FIFO update order for updates to datasets is not guaranteed.

According to another embodiment, method 500 further includes: performing a pre-validation for the selected first runnable dataflow of the first dataflow type for execution by checking to verify that system limits for executing the first dataflow type are allowable; creating a transient instance of the selected first runnable dataflow within a first thread which is observable by other threads executing within the system and initiating execution of the selected first runnable dataflow; and performing a post-validation for the selected first runnable dataflow of the first dataflow type by verifying that the selected first runnable dataflow is not already executing within the system via a different thread based on a dedup key associated with the selected first runnable dataflow.

According to described embodiments, it is possible that different threads may belong to (e.g., may be executing upon) different application servers, and therefore, a normal Java synchronize keyword/function is not sufficient due to the inability to observe and synchronize disparate threads across different physical machines. Creation of a transient instance is therefore provided for different threads, including possibly different threads executing on different physical machines, providing the requisite communication given that a same customer organization will be residing within the same storage server.

According to a particular embodiment, there is a non-transitory computer readable storage media having instructions stored thereon that, when executed by a processor of a system, the instructions cause the system to perform operations including: creating a dataflow definition for a first dataflow type, in which the dataflow definition includes at least one or more datasets to be accessed by the dataflow and a plurality of functional operations to be performed on the one or more datasets when the dataflow is executed; generating and storing a dataflow version identifying all datasets accessed by the dataflow based on the dataflow definition created; receiving multiple requests for the first dataflow type; enqueuing the multiple requests into a message queue pending execution; and selecting, from the message queue, a first runnable dataflow of the first dataflow type for execution based on (i) the first dataflow type being allowable within system limits and based further on (ii) verification that the selected first runnable dataflow is not already executing and based further on (iii) verification there is no write conflict for any dataset accessed by the selected first runnable dataflow.

According to another embodiment of the non-transitory computer readable storage media, enqueuing the multiple requests of different dataflow request types together into the message queue; and further in which the message queue having the multiple requests of different dataflow request types enqueued therein applies different concurrency limits to each different dataflow request type.

According to another embodiment, the non-transitory computer readable storage media includes further instructions for receiving multiple requests for a second dataflow type, different than the first dataflow type; enqueuing the multiple requests for the second dataflow type into the message queue pending execution; and selecting one or more of the second dataflow types for execution based on a determination that the selected second dataflow type does not have a write conflict for any dataset accessed by the selected first runnable dataflow of the first dataflow type.

According to another embodiment, the non-transitory computer readable storage media includes further instructions for sending, via a distribution engine, the selected first runnable dataflow for execution to one of a plurality of Superpod worker nodes within a Superpod, in which the Superpod is isolated from a plurality of customer organizations accessing the system and further in which the Superpod accepts customer requested dataflows from the distribution engine subject to system limits.

According to another embodiment of the non-transitory computer readable storage media, selecting a first runnable dataflow for execution based on the first dataflow type being allowable within system limits includes: the selecting being allowable based on a quantity of concurrent dataflow executions for the first dataflow type; the selecting being allowable based on a quantity of concurrent dataflow executions for a customer organization having requested execution of the dataflow, when the first dataflow type is determined to be a user dataflow request; the selecting being allowable based on a quantity of concurrent dataflow executions of the first dataflow type for the system, when the first dataflow type is determined to be a system dataflow request.

According to another embodiment of the non-transitory computer readable storage media, selecting, from the message queue, a first runnable dataflow of the first dataflow type for execution includes: querying the message queue from a message handler for all enqueued dataflow requests of all dataflow types, ordered by creation date; identifying an earliest one of the enqueued dataflow requests that meet all of the following criteria: (i) sufficient slots remain in accordance with the system limits to begin execution of the earliest identified dataflow requests, (ii) the earliest identified dataflow request is verified to not already be executing based on a dedup key, (iii) the earliest identified dataflow is verified to have write conflicts on any dataset touched by any other dataflow presently executing via the system.

According to such embodiments, when a concurrency manager executes a fetch request from the message queue for all requests having a "new" state, the fetch will be performed for all dataflow requests regardless of dataflow type. If different threads were to handle different types of dataflow requests at different times or handle them separately, the FIFO order could be violated as it would be possible that a system dataflow may attempt to write to the same underlying dataset as a concurrently executing user dataflow, thus potentially violating the FIFO requirement. Therefore, while different dataflow types are isolated from one another in terms of concurrency limits (e.g., a user dataflow may have a different concurrency limit than a system dataflow), such dataflows are nevertheless connected by their writing references, and as such, even where dataflows of different types are treated in isolation for the sake of system resource utilization, they must be treated in a common and consistent manner with respect to any dataset written to or touched by the dataflow, regardless of its type or origin.

According to another embodiment, the non-transitory computer readable storage media includes further instructions for performing a pre-validation for the selected first runnable dataflow of the first dataflow type for execution by checking to verify that system limits for executing the first dataflow type are allowable; creating a transient instance of the selected first runnable dataflow within a first thread which is observable by other threads executing within the system and initiating execution of the selected first runnable dataflow; and performing a post-validation for the selected first runnable dataflow of the first dataflow type by verifying that the selected first runnable dataflow is not already executing within the system via a different thread based on a dedup key associated with the selected first runnable dataflow.

Figure 6:
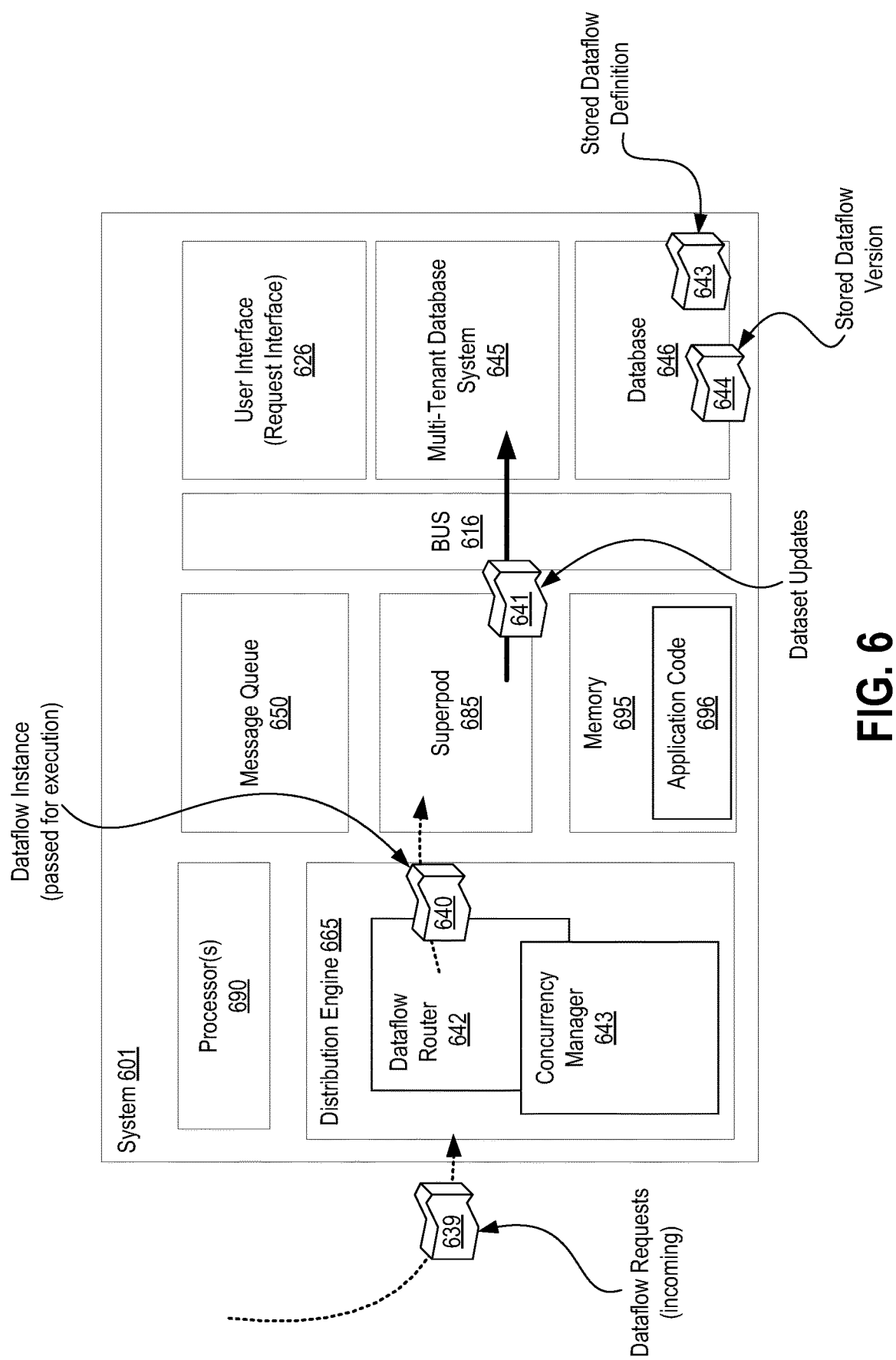
FIG. 6 shows a diagrammatic representation of a system within which embodiments may operate, be installed, integrated, or configured.

FIG. 6 shows a diagrammatic representation of a system 601 within which embodiments may operate, be installed, integrated, or configured. In accordance with one embodiment, there is a system 601 having at least a processor 690 and a memory 695 therein to execute implementing application code 696. Such a system 601 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 601, which may operate within a host organization, includes the processor 690 and the memory 695 to execute instructions at the system 601. According to such an embodiment, the system 601 further includes: a dataflow definition 643 for a first dataflow type, in which the dataflow definition 643 includes at least one or more datasets to be accessed by the dataflow and a plurality of functional operations to be performed on the one or more datasets when the dataflow is executed; a dataflow version 644 stored within a database of the system, the dataflow version identifying all datasets accessed by the dataflow based on the dataflow definition 643 created; a request interface 626 of the system to receive multiple requests 639 for the first dataflow type; a message queue 650 to enqueue the multiple requests 639 pending execution; and a concurrency manager 643 to select, from the message queue 650, a first runnable dataflow of the first dataflow type for execution 640 based on (i) the first dataflow type being allowable within system limits and based further on (ii) verification that the selected first runnable dataflow is not already executing and based further on (iii) verification there is no write conflict for any dataset accessed by the selected first runnable dataflow. Such a selected dataflow for execution may be sent to Superpod 685 for execution, which then transmits dataset updates as output to the multi-tenant database system 645. The distribution engine 665 includes a dataflow router 642 and the concurrency manager 643 to select and route dataflow requests to the Superpod 685 for execution.

According to another embodiment of the system 601, a user interface 626 operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives inputs from the client device to design the application as a request for services from the cloud based service provider.

Bus 616 interfaces the various components of the system 601 amongst each other, with any other peripheral(s) of the system 601, and with external components such as external network elements, other machines, client devices, cloud computing services, etc. Communications may further include communicating with external devices via a network interface over a LAN, WAN, or the public Internet.

Figure 7A:
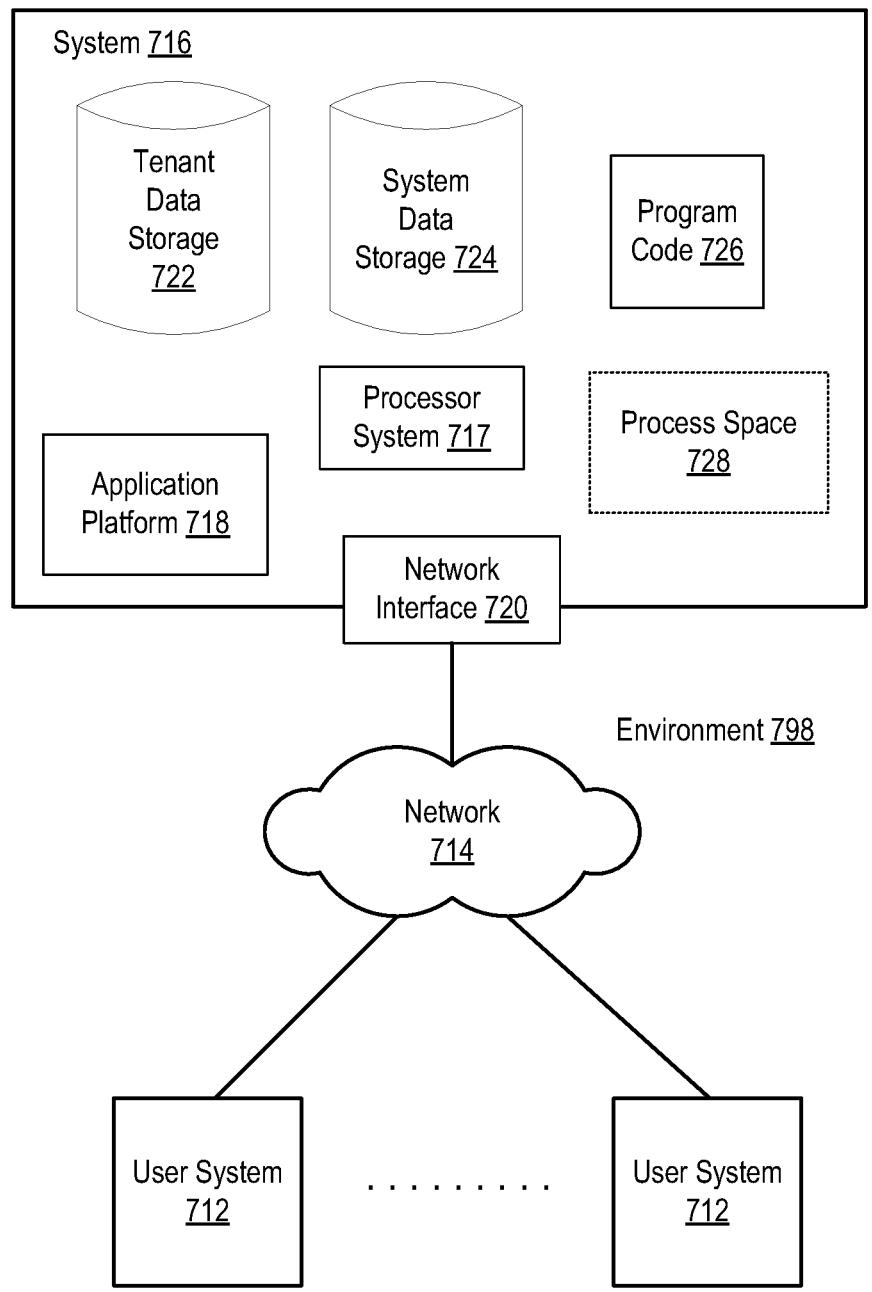
FIG. 7A illustrates a block diagram of an environment in which an on-demand database service may operate in accordance with the described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
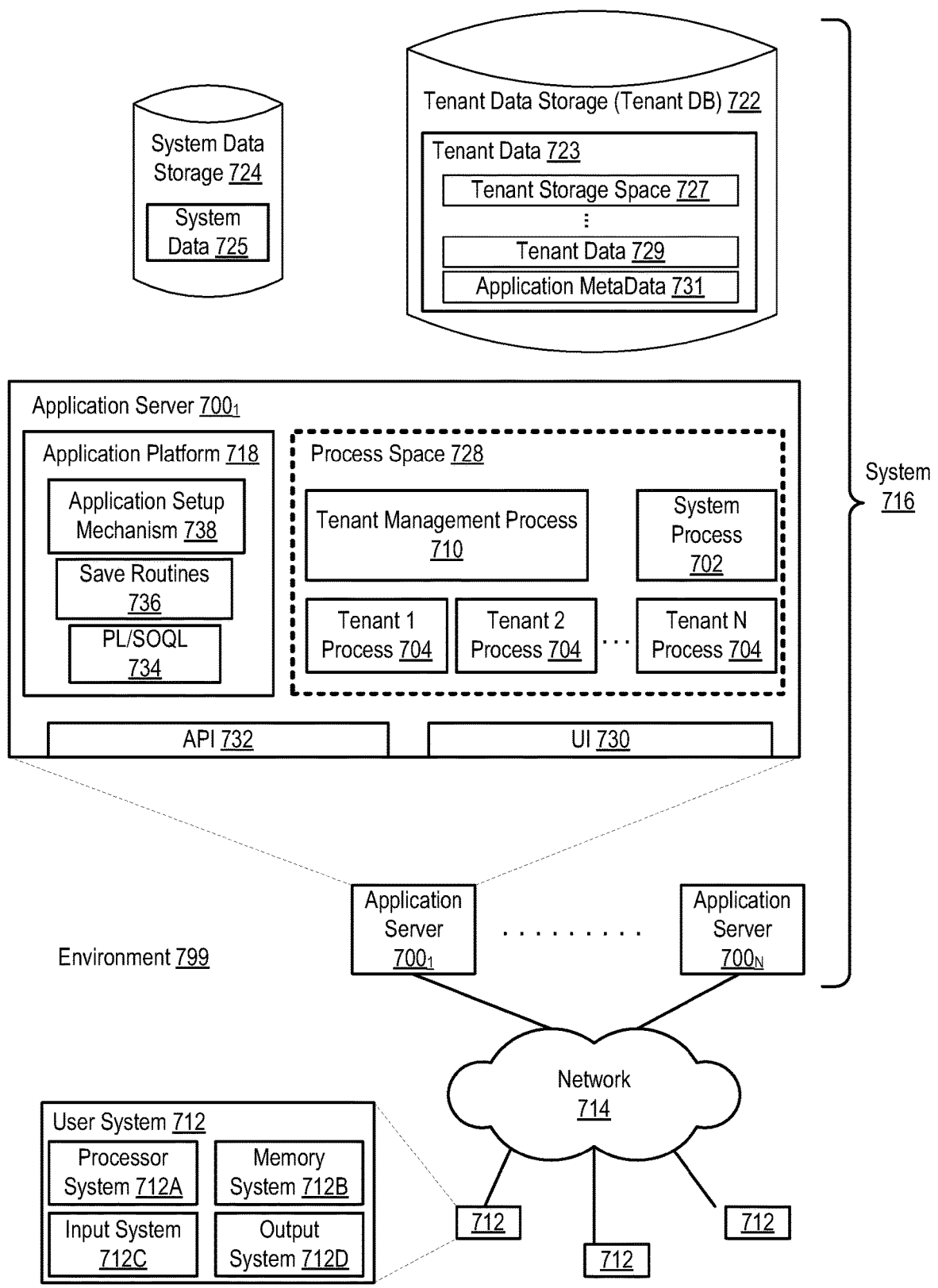
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers $700_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage space 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8:
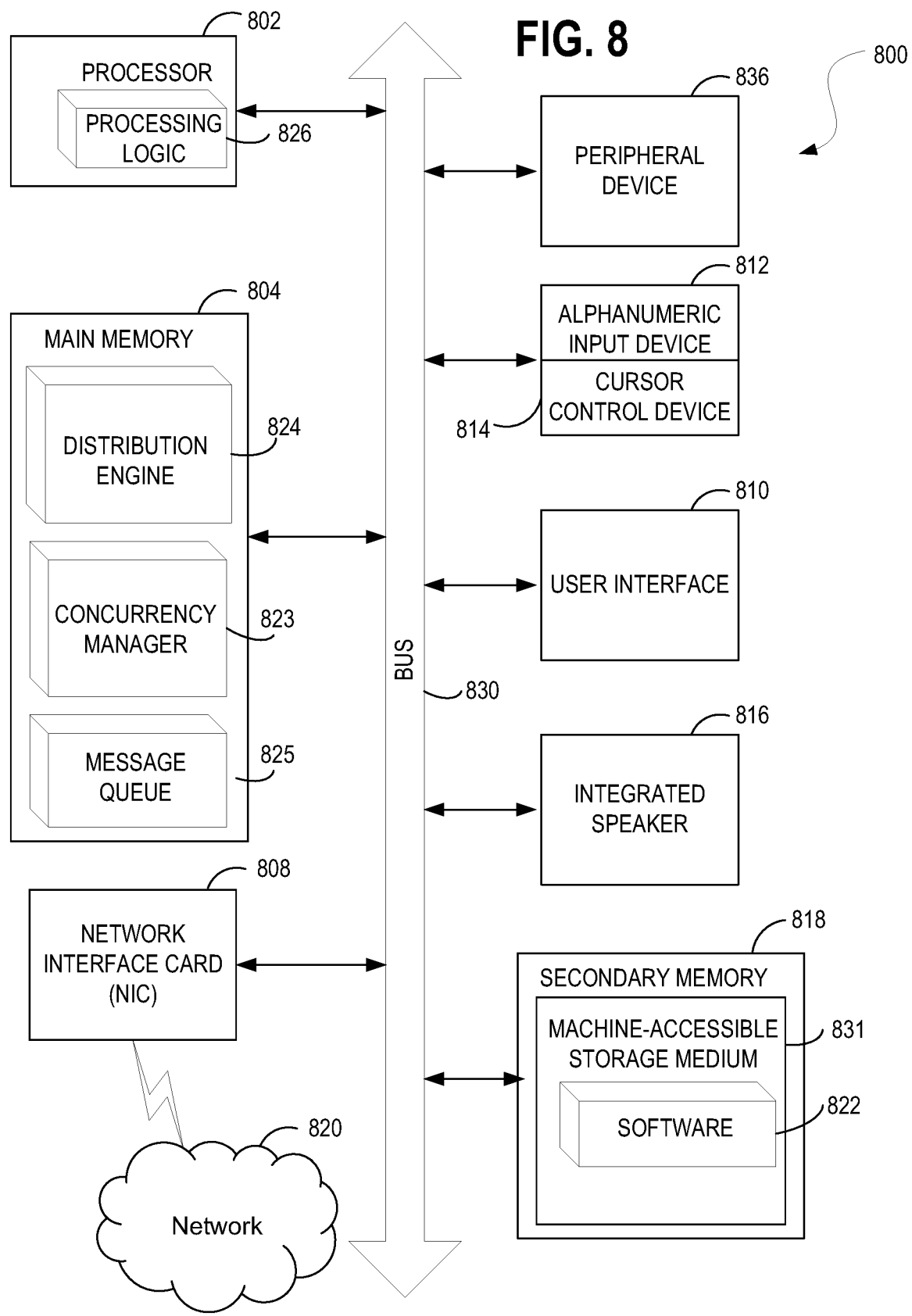
FIG. 8 illustrates a diagrammatic representation of a machine in the exemplary form of a computer system, in accordance with one embodiment.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes a distribution engine 824 and a concurrency manager 825 and a message queue 823 by which to receive, manage, enqueue, analyze, and select for execution dataflow requests pending execution by the system in accordance with described embodiments. Main memory 804 and its sub-elements are operable in conjunction with processing logic 826 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality, which is discussed herein.

The computer system 800 may further include a network interface card 808. The computer system 800 also may include a user interface 810 (such as a video display unit, a liquid crystal display, etc.), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein, wherein the method comprises:
    creating a dataflow definition for a first dataflow type, the dataflow definition specifying one or more datasets to be accessed by the dataflow type and a plurality of functional operations to be performed on the one or more datasets when the dataflow type is executed;
    generating and storing a dataflow version identifying all datasets accessed by the dataflow type based on the dataflow definition created;
    receiving multiple requests to execute the first dataflow type;
    enqueuing the multiple requests into a message queue pending execution;
    selecting, from the message queue, a first runnable dataflow of the first dataflow type having been earliest enqueued for execution based on (i) the first dataflow type being allowable within system limits and based further on (ii) verification that the selected first runnable dataflow is not already executing and based further on (iii) verification there is no write conflict for any dataset accessed by the selected first runnable dataflow; and
    verifying a FIFO (First In First Out) update order is enforced for updates to any dataset accessed by the first runnable dataflow selected for execution based on creation date of the dataflow request and delaying execution by re-queuing the first runnable dataflow selected for execution when the FIFO update order for updates to datasets is not guaranteed.

2. The method of claim 1:
    wherein enqueuing the multiple requests into a message queue comprises enqueuing the multiple requests of different dataflow request types together into the message queue; and
    wherein the message queue having the multiple requests of different dataflow request types enqueued therein applies different concurrency limits to each different dataflow request type.

3. The method of claim 1, further comprising:
    receiving multiple requests for a second dataflow type, different than the first dataflow type;
    enqueuing the multiple requests for the second dataflow type into the message queue pending execution; and
    selecting one or more of the second dataflow types for execution based on a determination that the selected second dataflow type does not have a write conflict for any dataset accessed by the selected first runnable dataflow of the first dataflow type.

4. The method of claim 1, further comprising:
    sending, via a distribution engine, the selected first runnable dataflow for execution to one of a plurality of Superpod worker nodes within a Superpod, wherein the Superpod is isolated from a plurality of customer organizations accessing the system and further wherein the Superpod accepts customer requested dataflows from the distribution engine subject to system limits.

5. The method of claim 1, wherein the first dataflow type comprises one of:
    a user defined dataflow having a fixed payload stored in a database of the system; and
    a system defined dataflow having a dynamically generated payload retrieved at runtime of the dataflow by the system.

6. The method of claim 1, wherein selecting, from the message queue, a first runnable dataflow of the first dataflow type for execution comprises:
    querying the message queue from a message handler for all enqueued dataflow requests of all dataflow types, ordered by creation date;
    identifying an earliest one of the enqueued dataflow requests that meet all of the following criteria: (i) sufficient slots remain in accordance with the system limits to begin execution of the earliest identified dataflow requests, (ii) the earliest identified dataflow request is verified to not already be executing based on a dedup key, (iii) the earliest identified dataflow is verified to have write conflicts on any dataset touched by any other dataflow presently executing via the system.

7. The method of claim 1, wherein selecting the first runnable dataflow for execution based on the first dataflow type being allowable within the system limits comprises:
    the selecting being allowable based on a quantity of concurrent dataflow executions for the first dataflow type;
    the selecting being allowable based on a quantity of concurrent dataflow executions for a customer organization having requested execution of the dataflow, when the first dataflow type is determined to be a user dataflow request;
    the selecting being allowable based on a quantity of concurrent dataflow executions of the first dataflow type for the system, when the first dataflow type is determined to be a system dataflow request.

8. The method of claim 1, further comprising:
    performing a pre-validation for the selected first runnable dataflow of the first dataflow type for execution by checking to verify that system limits for executing the first dataflow type are allowable;
    creating a transient instance of the selected first runnable dataflow within a first thread which is observable by other threads executing within the system and initiating execution of the selected first runnable dataflow; and performing a post-validation for the selected first runnable dataflow of the first dataflow type by verifying that the selected first runnable dataflow is not already executing within the system via a different thread based on a dedup key associated with the selected first runnable dataflow.

9. A method performed by a system having at least a processor and a memory therein, wherein the method comprises:

creating a dataflow definition for a first dataflow type, the dataflow definition specifying one or more datasets to be accessed by the dataflow type and a plurality of functional operations to be performed on the one or more datasets when the dataflow type is executed;

generating and storing a dataflow version identifying all datasets accessed by the dataflow type based on the dataflow definition created;

receiving multiple requests to execute the first dataflow type;

enqueuing the multiple requests into a message queue pending execution;

selecting, from the message queue, a first runnable dataflow of the first dataflow type having been earliest enqueued for execution based on (i) the first dataflow type being allowable within system limits and based further on (ii) verification that the selected first runnable dataflow is not already executing and based further on (iii) verification there is no write conflict for any dataset accessed by the selected first runnable dataflow;

wherein selecting the first runnable dataflow for execution based on the first dataflow type being allowable within the system limits comprises:

the selecting being allowable based on a quantity of concurrent dataflow executions for the first dataflow type;

the selecting being allowable based on a quantity of concurrent dataflow executions for a customer organization having requested execution of the dataflow, when the first dataflow type is determined to be a user dataflow request; and the selecting being allowable based on a quantity of concurrent dataflow executions of the first dataflow type for the system, when the first dataflow type is determined to be a system dataflow request.

10. A system to execute within a host organization, wherein the system comprises:

a processor and a memory to execute instructions at the system;

a dataflow definition for a first dataflow type, the dataflow definition specifying one or more datasets to be accessed by the dataflow type and a plurality of functional operations to be performed on the one or more datasets when the dataflow type is executed;

a dataflow version stored within a database of the system, the dataflow version identifying all datasets accessed by the dataflow type based on the dataflow definition created;

a request interface of the system to receive multiple requests to execute the first dataflow type;

a message queue to enqueue the multiple requests pending execution; and a concurrency manager to select, from the message queue, a first runnable dataflow of the first dataflow type having been earliest enqueued for execution based on (i) the first dataflow type being allowable within system limits and based further on (ii) verification that the selected first runnable dataflow is not already executing and based further on (iii) verification there is no write conflict for any dataset accessed by the selected first runnable dataflow; and wherein the message queue is to verify a FIFO (First In First Out) update order is enforced for updates to any dataset accessed by the first runnable dataflow selected for execution based on creation date of the dataflow request and delay execution by re-queuing the first runnable dataflow selected for execution when the FIFO update order for updates to datasets is not guaranteed.

11. The system of claim 10, wherein the message queue to enqueue the multiple requests pending execution comprises the message queue to enqueue the multiple requests of different dataflow request types together into the message queue; and wherein the message queue having the multiple requests of different dataflow request types enqueued therein applies different concurrency limits to each different dataflow request type.

12. The system of claim 10:

wherein the request interface of the system is to receive multiple requests for a second dataflow type, different than the first dataflow type;

wherein the message queue to enqueue the multiple requests for the second dataflow type into the message queue pending execution; and wherein the concurrency manager to select, from the message queue, one or more of the second dataflow types for execution based on a determination that the selected second dataflow type does not have a write conflict for any dataset accessed by the selected first runnable dataflow of the first dataflow type.

13. The system of claim 10, further comprising:

a distribution engine to send the selected first runnable dataflow for execution to one of a plurality of Superpod worker nodes within a Superpod, wherein the Superpod is isolated from a plurality of customer organizations accessing the system and further wherein the Superpod accepts customer requested dataflows from the distribution engine subject to system limits.

14. The system of claim 10:

wherein the concurrency manager is to select the first runnable dataflow for execution based on being allowable within system limits comprises:

the selecting being allowable based on a quantity of concurrent dataflow executions for the first dataflow type;

the selecting being allowable based on a quantity of concurrent dataflow executions for a customer organization having requested execution of the dataflow, when the first dataflow type is determined to be a user dataflow request;

the selecting being allowable based on a quantity of concurrent dataflow executions of the first dataflow type for the system, when the first dataflow type is determined to be a system dataflow request.

15. The system of claim 10, wherein the first dataflow type comprises one of:

a user defined dataflow having a fixed payload stored in a database of the system; and a system defined dataflow having a dynamically generated payload retrieved at runtime of the dataflow by the system.

16. The system of claim 10, wherein the concurrency manager to select, from the message queue, the first runnable dataflow of the first dataflow type for execution comprises:
- a message handler to query the message queue for all enqueued dataflow requests of all dataflow types, ordered by creation date; and
- the concurrency manager to identify an earliest one of the enqueued dataflow requests that meet all of the following criteria: (i) sufficient slots remain in accordance with the system limits to begin execution of the earliest identified dataflow requests, (ii) the earliest identified dataflow request is verified to not already be executing based on a dedup key, (iii) the earliest identified dataflow is verified to have write conflicts on any dataset touched by any other dataflow presently executing via the system.

17. The system of claim 10, wherein the concurrency manager is to further verify a FIFO (First In First Out) update order is enforced for updates to any dataset accessed by the dataflow selected for execution based on creation date of the dataflow request associated with the dataflow to be executed; and
- wherein the concurrency manager is to delay execution by re-queuing the dataflow request selected for execution when the FIFO update order for updates to datasets is not guaranteed.

18. The system of claim 10:
- wherein the concurrency manager is to further perform a pre-validation for the selected first runnable dataflow of the first dataflow type for execution by checking to verify that system limits for executing the first dataflow type are allowable;
- wherein the concurrency manager is to create a transient instance of the selected first runnable dataflow within a first thread which is observable by other threads executing within the system and initiating execution of the selected first runnable dataflow; and
- wherein the concurrency manager is to further perform a post-validation for the selected first runnable dataflow of the first dataflow type by verifying that the selected first runnable dataflow is not already executing within the system via a different thread based on a dedup key associated with the selected first runnable dataflow.

19. Non-transitory computer readable storage media having instructions stored thereon that, when executed by a processor of a system, the instructions cause the system to perform operations including:
- creating a dataflow definition for a first dataflow type, the dataflow definition specifying one or more datasets to be accessed by the dataflow type and a plurality of functional operations to be performed on the one or more datasets when the dataflow type is executed;
- generating and storing a dataflow version identifying all datasets accessed by the dataflow type based on the dataflow definition created;
- receiving multiple requests to execute the first dataflow type;
- enqueuing the multiple requests into a message queue pending execution;
- selecting, from the message queue, a first runnable dataflow of the first dataflow type having been earliest enqueued for execution based on (i) the first dataflow type being allowable within system limits and based further on (ii) verification that the selected first runnable dataflow is not already executing and based further on (iii) verification there is no write conflict for any dataset accessed by the selected first runnable dataflow; and
- verifying a FIFO (First In First Out) update order is enforced for updates to any dataset accessed by the first runnable dataflow selected for execution based on creation date of the dataflow request and delaying execution by re-queuing the first runnable dataflow selected for execution when the FIFO update order for updates to datasets is not guaranteed.

20. The non-transitory computer readable storage media of claim 19:
- wherein enqueuing the multiple requests into a message queue comprises enqueuing the multiple requests of different dataflow request types together into the message queue; and
- wherein the message queue having the multiple requests of different dataflow request types enqueued therein applies different concurrency limits to each different dataflow request type.

21. The non-transitory computer readable storage media of claim 19, wherein the instructions, when executed by the processor of the system, cause the system to perform further operations including:
- receiving multiple requests for a second dataflow type, different than the first dataflow type;
- enqueuing the multiple requests for the second dataflow type into the message queue pending execution; and
- selecting one or more of the second dataflow types for execution based on a determination that the selected second dataflow type does not have a write conflict for any dataset accessed by the selected first runnable dataflow of the first dataflow type.

22. The non-transitory computer readable storage media of claim 19, wherein the instructions, when executed by the processor of the system, cause the system to perform further operations including:
- sending, via a distribution engine, the selected first runnable dataflow for execution to one of a plurality of Superpod worker nodes within a Superpod, wherein the Superpod is isolated from a plurality of customer organizations accessing the system and further wherein the Superpod accepts customer requested dataflows from the distribution engine subject to system limits.

23. The non-transitory computer readable storage media of claim 19:
- wherein selecting a first runnable dataflow for execution based on the first dataflow type being allowable within system limits comprises:
- the selecting being allowable based on a quantity of concurrent dataflow executions for the first dataflow type;
- the selecting being allowable based on a quantity of concurrent dataflow executions for a customer organization having requested execution of the dataflow, when the first dataflow type is determined to be a user dataflow request;
- the selecting being allowable based on a quantity of concurrent dataflow executions of the first dataflow type for the system, when the first dataflow type is determined to be a system dataflow request.

24. The non-transitory computer readable storage media of claim 19, wherein selecting, from the message queue, a first runnable dataflow of the first dataflow type for execution comprises:

querying the message queue from a message handler for all enqueued dataflow requests all dataflow types, ordered by creation date;

identifying an earliest one of the enqueued dataflow requests that meet all of the following criteria: (i) sufficient slots remain in accordance with the system limits to begin execution of the earliest identified dataflow requests, (ii) the earliest identified dataflow request is verified to not already be executing based on a dedup key, (iii) the earliest identified dataflow is verified to have write conflicts on any dataset touched by any other dataflow presently executing via the system.

25. The non-transitory computer readable storage media of claim 19, wherein selecting, from the message queue, a first runnable dataflow of the first dataflow type for execution comprises:

performing a pre-validation for the selected first runnable dataflow of the first dataflow type for execution by checking to verify that system limits for executing the first dataflow type are allowable;

creating a transient instance of the selected first runnable dataflow within a first thread which is observable by other threads executing within the system and initiating execution of the selected first runnable dataflow; and performing a post-validation for the selected first runnable dataflow of the first dataflow type by verifying that the selected first runnable dataflow is not already executing within the system via a different thread based on a dedup key associated with the selected first runnable dataflow.

* * * * *